(12) United States Patent
Frenne et al.

(10) Patent No.: US 10,284,310 B2
(45) Date of Patent: May 7, 2019

(54) WIRELESS DEVICE, NETWORK NODE, METHODS THEREIN, FOR RESPECTIVELY SENDING AND RECEIVING A REPORT ON QUALITY OF TRANSMITTED BEAMS

(71) Applicant: Telefonaktiebolaget LM Ericsson (publ), Stockholm (SE)

(72) Inventors: Mattias Frenne, Uppsala (SE); Stefan Parkvall, Bromma (SE); Johan Furuskog, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 239 days.

(21) Appl. No.: 15/102,063

(22) PCT Filed: Oct. 28, 2014

(86) PCT No.: PCT/SE2014/051269
§ 371 (c)(1),
(2) Date: Jun. 6, 2016

(87) PCT Pub. No.: WO2015/088419
PCT Pub. Date: Jun. 18, 2015

(65) Prior Publication Data
US 2016/0337056 A1 Nov. 17, 2016

Related U.S. Application Data

(60) Provisional application No. 61/915,561, filed on Dec. 13, 2013.

(51) Int. Cl.
*H04W 24/10* (2009.01)
*H04W 84/04* (2009.01)
(Continued)

(52) U.S. Cl.
CPC ......... *H04B 17/309* (2015.01); *H04B 7/0413* (2013.01); *H04B 7/0695* (2013.01);
(Continued)

(58) Field of Classification Search
CPC ........................... H04W 24/10; H04W 84/042
See application file for complete search history.

(56) References Cited

U.S. PATENT DOCUMENTS

2009/0312044 A1 12/2009 Hottinen
2013/0003788 A1* 1/2013 Marinier ............... H04B 7/024
375/219

(Continued)

FOREIGN PATENT DOCUMENTS

| EP | 2175573 A1 | 4/2010 |
|---|---|---|
| WO | WO 2013/024852 A1 | 2/2013 |
| WO | WO 2013/133672 A1 | 9/2013 |

OTHER PUBLICATIONS

International Search Report, Application No. PCT/SE2014/051269, dated Feb. 17, 2015.
(Continued)

*Primary Examiner* — Edan Orgad
*Assistant Examiner* — Emmanuel K Maglo
(74) *Attorney, Agent, or Firm* — Sage Patent Group

(57) ABSTRACT

Embodiments herein relate to methods performed by a wireless device for sending a report on channel information to a network node, methods performed by a network node for receiving a report on channel information, and corresponding wireless devices and network nodes. A network node controls at least one Transmission Point (TP) that transmits TP beams. Each TP beam is associated with respective beamformed Beam-specific Reference Signal (BRS) for channel information measurements. The wireless device sends the report, which comprises a number of
(Continued)

sub-reports, to the network node. Each sub-report is associated with a TP beam. Each associated TP beam comprises at least one BRS and is selected by the device. Each sub-report is also associated with an indicator of channel quality value for one code word transmitted by the network node on the associated TP beam.

26 Claims, 17 Drawing Sheets

(51) Int. Cl.
*H04B 17/309* (2015.01)
*H04B 7/06* (2006.01)
*H04B 7/08* (2006.01)
*H04B 7/0413* (2017.01)

(52) U.S. Cl.
CPC ............ *H04B 7/088* (2013.01); *H04W 24/10* (2013.01); *H04W 84/042* (2013.01)

(56) References Cited

U.S. PATENT DOCUMENTS

| | | | |
|---|---|---|---|
| 2013/0039349 A1* | 2/2013 | Ebrahimi Tazeh Mahalleh | H04L 1/0013 370/336 |
| 2013/0083681 A1* | 4/2013 | Ebrahimi Tazeh Mahalleh | H04L 5/0057 370/252 |
| 2013/0163457 A1* | 6/2013 | Kim | H04W 24/02 370/252 |
| 2013/0301447 A1* | 11/2013 | Gomadam | H04W 24/10 370/252 |
| 2013/0301542 A1* | 11/2013 | Krishnamurthy | H04W 52/50 370/329 |
| 2013/0329772 A1* | 12/2013 | Wernersson | H04B 7/0626 375/219 |
| 2014/0003240 A1* | 1/2014 | Chen | H04W 28/08 370/235 |
| 2014/0036796 A1* | 2/2014 | Etemad | H04W 4/70 370/329 |
| 2014/0064109 A1* | 3/2014 | Krishnamurthy | H04B 7/0456 370/252 |
| 2014/0086082 A1* | 3/2014 | Kim | H04B 17/345 370/252 |
| 2014/0177744 A1* | 6/2014 | Krishnamurthy | H04B 7/0469 375/267 |
| 2014/0211731 A1 | 7/2014 | Inoue et al. | |
| 2015/0029885 A1* | 1/2015 | Seo | H04W 24/10 370/252 |
| 2016/0065290 A1* | 3/2016 | Zhu | H04W 52/0209 370/329 |
| 2016/0353424 A1* | 12/2016 | Stirling-Gallacher | H04B 7/0626 |
| 2017/0339621 A1 | 11/2017 | Wang et al. | |

OTHER PUBLICATIONS

Written Opinion of the International Searching Authority, Application No. PCT/SE2014/051269, dated Feb. 17, 2015.
Communication Pursuant to Article 94(3) EPC, 14799057.6-1220, dated Oct. 25, 2018, 7 Pages.

* cited by examiner $$y = Wx = \begin{pmatrix} \underbrace{w_1 \quad w_2 \quad w_3 \quad w_4}_{\text{Beamforming weight vectors for codeword 1}} & \underbrace{w_5 \quad w_6 \quad w_7 \quad w_8}_{\text{Beamforming weight vectors for codeword 2}} \end{pmatrix} \begin{pmatrix} x_1 \\ x_2 \\ x_3 \\ x_4 \\ x_5 \\ x_6 \\ x_7 \\ x_8 \end{pmatrix} \begin{matrix} \text{Code Word} \\ 1 \\ \\ \\ \text{Code Word} \\ 2 \end{matrix}$$

$$\mathbf{y} = \mathbf{W}\mathbf{x} = \begin{pmatrix} \underset{\text{Beamforming weight vector for codeword 1}}{\mathbf{w}_1} & \mathbf{w}_2 & \mathbf{w}_3 & \mathbf{w}_4 & \mathbf{w}_5 & \mathbf{w}_6 & \mathbf{w}_7 & \underset{\text{Beamforming weight vector for codeword 8}}{\mathbf{w}_8} \end{pmatrix} \begin{pmatrix} x_1 \\ x_2 \\ x_3 \\ x_4 \\ x_5 \\ x_6 \\ x_7 \\ x_8 \end{pmatrix} \begin{matrix} \text{Code Word 1} \\ \\ \\ \\ \\ \\ \\ \text{Code Word 8} \end{matrix}$$

Figure 10

WIRELESS DEVICE, NETWORK NODE, METHODS THEREIN, FOR RESPECTIVELY SENDING AND RECEIVING A REPORT ON QUALITY OF TRANSMITTED BEAMS

CROSS REFERENCE TO RELATED APPLICATIONS

This application is a 35 U.S.C. § 371 national stage application of PCT International Application No. PCT/SE2014/051269, filed on Oct. 28, 2014, which itself claims the benefit of U.S. provisional Patent Application No. 61/915,561, filed Dec. 13, 2013, the disclosure and content of both of which are incorporated by reference herein in their entireties. The above-referenced PCT International Application was published in the English language as International Publication No. WO 2015/088419 A1 on Jun. 18, 2015.

TECHNICAL FIELD

The present disclosure relates wireless communications in general and in particular to a wireless device and method therein for sending a report to a network node and the network node and method therein for receiving the report from the wireless device.

BACKGROUND

Communication devices such as terminals are also known as e.g. User Equipments (UE), wireless devices, mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In $3^{rd}$ Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

The development of the future 5th Generation (5G) access technology and air interference is still very premature but there have been some early publications on potential technology candidates. A candidate on a 5G air interface is to scale the current LTE, which is limited to 20 Mega Hertz (MHz) bandwidth, N times in bandwidth with 1/N times shorter time duration, here abbreviated as LTE-Nx. A typical value may be N=5 so that the carrier has 100 MHz bandwidth and 0.1 millisecond slot lengths. With this scaled approach, many functions in LTE can be re-used in LTE-Nx, which would simplify standardization effort and allow for a reuse of technology components.

The carrier frequency for an anticipated 5G system may be much higher than current $3^{rd}$ Generation (3G) and 4th Generation (4G) systems, values in the range 10-80 Giga Hertz (GHz) have been discussed. At these high frequencies, an array antenna must be used to achieve coverage through beamforming gain, such as that depicted in FIG. 1.

FIG. 1 depicts a 5G system example with three Transmission Points (TP): TP1, TP2 and TP3, and a UE. Each TP utilizes beamforming for transmission. The beams are represented with white lobes in the figure.

Since the wavelength is less than 3 centimeters (cm), an array antenna with a large number of antenna elements may be fit into an antenna enclosure with a size comparable to 3G and 4G base station antennas of today. To achieve a reasonable link budget, a typical example of a total antenna array size is comparable to an A4 sheet of paper.

The beams are typically highly directive and give beamforming gains of 20 decibels (dB) or even more since so many antenna elements participate in forming a beam. This means that each beam is relatively narrow in horizontal and/or azimuth angle, a Half Power Beam Width (HPBW) of 5 degrees is not uncommon. Hence, a sector of a cell may need to be covered with a large number of potential beams. Beamforming may be seen as when a signal is transmitted in such as narrow HPBW that it is intended for a single wireless device or a group of wireless devices in a similar geographical position. This may be seen in contrast to other beam shaping techniques, such as cell shaping, where the coverage of a cell is dynamically adjusted to follow the geographical positions of a group of users in the cell. Although beamforming and cell shaping use similar techniques, i.e., transmitting a signal over multiple antenna elements and applying individual complex weights to these antenna elements, the notion of beamforming and beams in the embodiments described herein relates to the narrow HPBW basically intended for a single wireless device or terminal position.

Here, a system with multiple transmission nodes may be considered, where each node has an array antenna capable of generating many beams with small HPBW, such as that of FIG. 1. These nodes may then for instance use one or multiple LTE-Nx carriers, so that a total transmission bandwidth of multiples of hundreds of MHz may be achieved leading to downlink peak user throughputs reaching as much as 10 Gigabytes (Gbit/s) or more.

Multi-Antenna Techniques

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

One of the important characteristics of the channel conditions in the field of high rate multi-antenna transmission is the so-called channel rank. Roughly speaking, the channel rank may vary from one up to the minimum number of transmit and receive antennas. Taking a 4×2 system as an example, i.e., a system with four transmitter antennas and two receive antennas; the maximum channel rank is two. The channel rank may vary in time, as the fast fading alters the channel coefficients.

The LTE standard has MIMO support. A core component in LTE is the support of MIMO antenna deployments and MIMO related techniques. In LTE-Advanced there is enhanced support of up to 8-layer spatial multiplexing for 8 Transmission (Tx) antennas with an enhanced channel dependent precoding. The precoding is aimed for high data rates in favorable channel conditions and is especially targeting cross-polarized antenna setups. An illustration of the spatial multiplexing operation is provided in FIG. 2, which depicts a transmission structure of precoded spatial multiplexing mode in LTE, where r layers to be transmitted to one UE, of which a code word may be mapped to more than one layer in general, are precoded with a precoding matrix with r input and N_T outputs, one per transmit antenna port from the eNB. Each of the N_T streams of precoded modulation symbols are then converted to a time domain signal using the inverse Fast Fourier Transform (IFFT). The up to 8 Tx antennas are assumed to be co-located, that is, placed at the same eNB site. This means that the UE may use the channel from any, or all, of the Tx antennas to estimate, e.g., Doppler parameters or delay spread since they are equal.

As can be described by expression (1) and also illustrated in FIG. 2, the information carrying symbol vector s is multiplied by an $N_T \times r$ precoder matrix $W_{N_T \times r}$, which serves to distribute the transmit energy in a subspace of the $N_T$, corresponding to $N_T$ antenna ports, dimensional vector space. The precoder matrix is typically selected from a codebook of possible precoder matrices, and typically indicated by means of a Precoder Matrix Indicator (PMI), which specifies a unique precoder matrix in the codebook for a given number of symbol streams. If the precoder matrix is confined to have orthonormal columns, then the design of the codebook of precoder matrices corresponds to a Grassmanian subspace packing problem. The r symbols in s each correspond to a layer and r is referred to as the transmission rank. In this way, spatial multiplexing is achieved since multiple symbols may be transmitted simultaneously over the same Time/Frequency Resource Element (TFRE). The number of symbols r is typically adapted to suit the current channel properties.

LTE uses Orthogonal Frequency Division Multiplexing (OFDM) in the DL, and Discrete Fourier Transform (DFT) precoded OFDM in the UL, and hence the received $N_R \times 1$ vector $y_n$ for a certain TFRE on subcarrier n, or alternatively data TFRE number n, is thus modeled by $$y_n = H_n W_{N_T \times r} s_n + e_n \quad (1)$$

where $e_n$ is a noise/interference vector obtained as realizations of a random process. The precoder, $W_{N_T \times r}$, may be a wideband precoder, which is constant over frequency, or frequency selective, where a new precoder may be used for each sub-band or block of resource blocks.

The precoder matrix $W_{N_T \times r}$ is often chosen to match the characteristics of the NRxNT MIMO channel matrix H, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced. Each column in $W_{N_T \times r}$ equals the precoding vector used for one layer, according to expression (1). For example, the first element in vector $s_n$ which represents a symbol transmitted on the first layer, is precoded using the first column on $W_{N_T \times r}$ according to the matrix-vector multiplication.

In closed-loop precoding for the LTE DL, the UE transmits, based on channel measurements in the forward link DL, recommendations to the eNodeB of a single suitable precoder $W_{N_T \times r}$ to use, in some feedback modes one precoder per subband. This is called Channel State Information (CSI) reporting. The reporting from the UE is constrained to a codebook, but the transmission from the eNodeB may or may not be constrained to a codebook. The former case corresponds to so-called codebook based transmit precoding on the transmit side and is usually associated with the use of Common Reference Signals (CRS) for demodulation. The case when the transmissions are not constrained to a precoder codebook usually relies on DeModulation Reference Signals (DMRS) for demodulation and is sometimes referred to as non-codebook based transmit precoding.

A single precoder that is supposed to cover a large bandwidth, wideband precoding, may be fed back in the Channel State Information (CSI) report. It may also be beneficial to match the frequency variations of the channel and instead feed back a frequency-selective precoding report, e.g. several precoders, one per subband. This is an example of the more general case of CSI feedback, which also encompasses feeding back other entities than precoders to assist the eNodeB in subsequent transmissions to the UE. Such other information in the CSI report may include Channel Quality Indicators (CQIs) as well as a transmission Rank Indicator (RI).

For the LTE uplink, the use of closed-loop precoding means the eNodeB is selecting precoder/s and transmission rank and thereafter signals the selected precoder that the UE is supposed to use.

The transmission rank, and thus the number of spatially multiplexed layers, is reflected in the number of columns of the precoder. For efficient performance, it is important that a transmission rank that matches the channel properties is selected. Often, the device selecting precoders is also responsible for selecting the transmission rank—one way is to simply evaluate a performance metric for each possible rank and pick the rank which optimizes the performance metric. These kinds of calculations are often computationally burdensome and it is therefore an advantage if calculations can be re-used across different transmission ranks. Re-use of calculations is facilitated by designing the precoder codebook to fulfill the so-called rank nested property. This means that the codebook is such that there always exists a column subset of a higher rank precoder that is also a valid lower rank precoder.

A common antenna setup is to use dual polarized antennas at the eNodeB where antennas with same polarizations are closely spaced, between 0.5 and 1 wavelength. Polarized antennas significantly reduce the total size of the antenna array used in multi-layer MIMO applications since the channels from different polarizations have low correlation, and are thus suitable for MIMO transmission. For best MIMO performance, channels from different antennas may have low correlation, while for best beamforming performance, channels from different antennas may instead have high correlation. In case of a dual polarized antenna setup, both are achieved, the closely spaced antennas of the same polarization have high correlation, thus suitable for a polarized beam. On the other hand, the closely spaced antennas of the other polarization, which are suitable for a second beam, have likely low correlation compared to the channel of the first polarization beam, although the average channel gain of the two polarization beams are equal, if the beams are pointed in the same direction.

FIG. 3 depicts a dual polarized antenna array with four antenna elements of −45 degree slanted polarization, represented as solid bars, and a second array of four antenna elements with +45 degrees slanted polarization, represented as dashed bars. Each polarization has a precoder that maps the transmitted bits on to the four antenna elements, i.e. four transmit antenna ports, where the phase and possibly also amplitude precoding weights is applied for each antenna element to form a polarization beam.

An LTE codebook targeting the dual polarized transmit antenna setup was introduced in Rel-10 for 8 Tx eNodeB and in Rel-12 for 4 Tx eNodeB. In this codebook, a codebook of precoding matrices $\tilde{w}$ with smaller than the full dimension of the antenna array was introduced, targeting a co-polarized antenna group only. Hence, the precoding matrix $\tilde{w}$ corresponds to a polarization precoder in FIG. 3, which is illustrated as the precoder for polarization 1 and the precoder for polarization 2, respectively. Since the correlation is high within the antenna group having the same polarization, due to the narrow antenna spacing, it may be appropriate to use a grid of beam codebook implemented from DFT based precoder vectors for $\tilde{w}$. This precoder may also be known as the inner precoder.

The outer precoder, $W^{(t)}$, adjusts the relative phase shift between the precoded polarizations. For rank 1, the precoder may for example be formed as:

$$W = \begin{bmatrix} \tilde{w} & 0 \\ 0 & \tilde{w} \end{bmatrix} w^{(t)} = \begin{bmatrix} \tilde{w} & 0 \\ 0 & \tilde{w} \end{bmatrix} \begin{bmatrix} 1 \\ \alpha \end{bmatrix}, \quad (2)$$

$$\alpha \in \{1, -1, j, -j\}$$

As shown here, the tuning precoder $W^{(t)}=[1\alpha]^T$ adjusts the phase between a first and a second group of antennas. Also, the same inner precoder $\tilde{w}$ is used for both polarizations in this example. In this case, the first and second groups correspond to the upper and lower halves, respectively, of the rows of the precoder W.

FIG. 4 illustrates transmission of a code word over a dual polarized antenna setup in LTE, where the UE selects the DFT based polarization precoder vectors for $\tilde{w}$, and the co-phasing angle alpha (α). Hence, the same code word is transmitted in the two polarization beams but one of them is multiplied with a co-phasing term alpha so that the two code word copies are coherently combined in the receiver.

The rank 2 case follows similarly in the LTE codebook as:

$$W = \begin{bmatrix} \tilde{w} & 0 \\ 0 & \tilde{w} \end{bmatrix} \begin{bmatrix} 1 & 1 \\ \alpha & -\alpha \end{bmatrix}, \quad (3)$$

$$\alpha \in \{i, j\},$$

See FIG. 5 for the corresponding description of this rank 2 precoder. FIG. 5 illustrates transmission of two code words over a dual polarized antenna setup in LTE, where the UE selects the DFT based polarization precoder vectors for W and the co-phasing angle α. Hence, the same code word is transmitted in the two polarization beams but one of them is multiplied with the co-phasing term a so that the two code word copies are coherently combined in the receiver. The second code word is transmitted in the same beams, but with the co-phasing angle −α.

Codewords and Codewords to Layer Mapping

Modern wireless communication systems targeted for packet based communication often include Hybrid Automatic Retransmission reQuest (HARQ) functionality on the physical layer to achieve robustness against the impairments of the radio channel. LTE and Wideband Code Division Multiple Access (WCDMA) are two examples of systems in which such functionality is available. The basic idea behind HARQ is to combine Forward Error Correction (FEC) with ARQ by encoding the information containing data block and then adding error-detection information such as Cyclic Redundancy Check (CRC). After reception of the coded data block, it may be decoded and the error-detection mechanism may be used to check whether the decoding was successful or not. If the data block was received without error, an ACKnowledgment (ACK) may be sent to the transmitter indicating successful transmission of the data block and that the receiver may be ready for a new data block. On the other hand, if the data block was not decoded correctly, a Negative ACKnowledgment (NACK) may be sent meaning that the receiver expects a retransmission of the same data block. Subsequent to the reception of the retransmission, the receiver may choose to either decode it independently or utilize some or all previous receptions of the same data block in the decoding process.

The encoded bits originating from the same block of information bits is referred to as a codeword. This is also the terminology used in LTE to describe the output from a single HARQ process serving a particular transport block and comprises turbo encoding, rate matching, interleaving etc. The codewords are then modulated and distributed over the antennas.

Precoding, as described in the previous sections, is a popular technique used in conjunction with multi-antenna transmission. The basic idea is to mix and distribute the modulation symbols over the antenna while possibly taking the current channel conditions into account. This is often realized by multiplying the information carrying symbol vector by a matrix selected to match the channel. The symbol vector may contain modulation symbols from potentially all the codewords and the codewords thus map to a sequence of symbol vectors. These sequences form a set of parallel symbol streams and each such symbol stream is referred to as a layer. Thus, depending on the precoder choice, a layer may directly correspond to a certain antenna or it may, via the precoder mapping, be distributed onto several antennas.

In a multi-antenna system, often referred to as a MIMO system, it may be appropriate to transmit data from several HARQ processes at once, also known as multi-codeword transmission. Depending on the channel conditions, this may substantially increase the data rates since in favorable conditions the channel may roughly support as many codewords as the minimum of the number of transmit and receive antennas. However, in LTE, the maximum number of code words is two, irrespectively of the number of transmit and receive antennas.

The channel rank, as described earlier, determines how many layers, and ultimately also codewords, may be successfully transmitted simultaneously. In conjunction with precoding, adapting the transmission to the channel rank involves using as many layers as the channel rank. In the simplest of cases, each layer may correspond to a particular antenna. The issue then arises of how to map the codewords to the layers. Taking the 4 transmit antenna case in LTE as an example, the maximum number of codewords is limited to two as mentioned above, while up to four layers may be transmitted. A fixed rank dependent mapping according to FIG. 6 is used. FIG. 6 illustrates a codeword to layer mapping for a four antenna system with precoding according to the description in LTE standard documents 3GPP TS 36.211, TS 36.212 and TS 36.213. For a single rank transmission, a first code word (CW1) is mapped to one layer and precoded with a precoding vector to map the precoded code word to all four transmit antenna ports. For rank 2, two code words (CW) are used, so there are two inputs to the precoder and four outputs. For rank 3, the second CW, CW2, has the double number of modulated symbols compared to CW1. This CW is then Serial to Parallel (S/P) converted into two layers, so CW1 is mapped to layer 1 and CW2 is mapped to layer 2 and layer 3 in LTE. All layers have the same number of modulated symbols. Since the number of CW is maximally two in LTE, there is also a S/P for CW1 in the rank 4 case. In rank 5 case, which is not shown in FIG. 6, there is a S/P operation for CW2 that splits CW2 into three layers, in total five layers. This principle holds up to 8 layer transmission, which is the maximum in LTE. If there is a retransmission of a CW, $CW_n$, where a S/P has been used in the previous, e.g., first, transmission of this CW, for example CW2 in a rank 3 transmission, then the S/P is used also in a rank 2 retransmission, which is shown in the lower left part of FIG. 6.

This also means that the first column of the precoding matrix determines the precoder for Code-Word 1 (CW 1) in a rank 1 transmission. For a rank 2 transmission, the second column of the precoding matrix determines the precoder for CW 2. Since there are at most 2 code words transmitted, it means that for rank 3 transmission, CW 1 is using the first column of the precoding matrix while CW2 is using column 2 and 3. Finally, for a rank 4 transmission, CW 1 may use column 1 and 2 whereas CW 2 may use column 3 and 4 of the precoding matrix.

If 8 Tx antennas are used, and up to 8 layer transmission is possible, then the same principle applies where for rank 5, CW 1 use column 1, 2 and CW 2 use column 3, 4, 5 and for rank 6 CW 1 use column 1, 2, 3 and CW 2 use column 4, 5, 6 and so on. FIG. 7 illustrates a rank 8 example of LTE codeword to layer mapping. Here, y is a N_T by 1 vector containing the precoded signals. W is the precoding N_T times r matrix, and x is the rx1 vector containing the r layers. The transmitted signal per antenna port is the matrix-vector product Wx. $W_1 \ldots w_8$ are the N_T times 1 precoding vectors, i.e., the beamforming weight vectors, for layer 1 . . . 8, respectively. $X_1 \ldots x_8$ is thus the modulated symbol transmitted on layer 1 . . . 8, respectively. In this figure, $x_1 \ldots x_4$ are coming from the same encoder output, i.e. they belong to the same Code Word 1 (CW1). And $x_5 \ldots x_8$ come from Code Word 2 (CW2). This means that the precoder for CW1 is the sub-matrix obtained by the columns $[w_1 \ldots w_4]$, and the precoder for CW2 is the sub-matrix obtained by the columns $[w_5 \ldots w_8]$.

To achieve high rank transmission in LTE, at lower carrier frequencies, a rich scattering channel is needed, sometimes characterized in the eigenvalue spread, ratio of the largest to the smallest eigenvalue, of the MIMO channel H. When the spread is close to one, the channel is rich in MIMO sense and precoders can be directed in any direction and still have very good channel gain. Hence, in this rich scattering environment, the benefit of precise precoding is reduced when rank is increased. This is reflected in the codebook design for the 8Tx LTE codebook, where fewer precoding matrix candidates exist for higher rank, and for rank 8, there is only a single precoding matrix, hence there may be no need for PMI feedback if rank 8 is signaled.

Existing methods for channel state feedback from a receiver to a transmitter are based on a number of assumptions, such as a rich scattering channel as just described, which are applicable to lower carrier frequencies of transmission than those expected to be used in future systems. These assumptions are no longer valid at higher carrier frequencies of transmission, which makes the existing methods for channel feedback inadequate for future transmission systems.

SUMMARY

It is an object of embodiments herein to improve the performance in a wireless communications network by providing an improved way for a wireless device to send a report on channel information, and for a network node to receive the report from the wireless device, the network using beamforming for transmitting to the wireless device.

According to an aspect of embodiments herein, the object is achieved by a method performed by a wireless device for sending a report on channel information to a network node. The network node controls at least one Transmission Point, TP, which at least one TP transmits TP beams. Each of at least a number N of the TP beams is associated with one or more respective beamformed Beam-specific Reference Signals, BRS, for channel information measurements. The wireless device and the network node operate in a wireless communications system. The wireless device sends the report on the channel information to the network node. The report on the channel information comprises a number of sub-reports. Each sub-report is associated with one respective TP beam of the N TP beams, which is an associated TP beam. Each one associated TP beam comprises at least one BRS of the one or more BRS associated with each of the N TP beams. Each one associated TP beam is selected by the wireless device. Each sub-report is also associated with at least one indicator of channel quality value. The indicator of channel quality value is for one code word transmitted by the network node on the associated TP beam.

According to another aspect of embodiments herein, the object is achieved by a method performed by the network node for receiving the report on channel information from the wireless device. The network node controls the at least one Transmission Point, TP, which at least one TP transmits TP beams. Each of at least a number N of the TP beams is associated with the one or more respective beamformed BRS, for channel information measurements. The wireless device and the network node operate in a wireless communications system. The network node receives the report on the channel information from the wireless device. The report on the channel information comprises the number of sub-reports. Each sub-report is associated with the one respective TP beam of the N TP beams, which is the associated TP beam. Each one associated TP beam comprises the at least one BRS of the one or more BRS associated with each of the N TP beams. Each one associated TP beam is selected by the wireless device. Each sub-report is also associated with the at least one indicator of channel quality value. The indicator of channel quality value is for the one code word transmitted by the network node on the associated TP beam.

According to another aspect of embodiments herein, the object is achieved by the wireless device configured to send a report on channel information to the network node. The network node is configured to control the at least one TP. The at least one TP is configured to transmit the TP beams. Each of the at least the number N of the TP beams is associated with the one or more respective beamformed BRS, for channel information measurements. The wireless device and the network node are configured to operate in the wireless communications system. The wireless device is further configured to send the report on the channel information to the network node. The report on the channel information comprises the number of sub-reports. Each sub-report is associated with one respective TP beam of the N TP beams, which is an associated TP beam. Each one associated TP beam comprises at least one BRS of the one or more BRS associated with each of the N TP beams. Each one associated TP beam is configured to have been selected by the wireless device. Each sub-report is also associated with at least one indicator of channel quality value. The indicator of channel quality value is for the one code word configured to be transmitted by the network node on the associated TP beam.

According to another aspect of embodiments herein, the object is achieved by the network node, configured to receive the report on channel information from the wireless device. The network node controls the at least one TP. The at least one TP transmits TP beams. Each of the at least the number N of the TP beams is associated with the one or more respective beamformed BRS, for channel information measurements. The wireless device and the network node are configured to operate in the wireless communications system. The network node is configured to receive the report on the channel information from the wireless device. The report on the channel information comprises the number of sub-reports. Each sub-report is associated with one respective TP beam of the N TP beams, which is an associated TP beam. Each one associated TP beam comprises at least one BRS of the one or more BRS associated with each of the N TP beams. Each one associated TP beam has been selected by the wireless device. Each sub-report is also associated with at least one indicator of channel quality value. The indicator of channel quality value is for the one code word configured to be transmitted by the network node on the associated TP beam.

By the wireless device sending the report with the number of sub-reports, each associated with one respective TP beam of the N TP beams, each one associated TP beam comprising the at least one BRS associated with each of the N TP beams, a code word may be mapped to each beam independently, and link adaptation per beam may be achieved by the feedback in the report. Since each sub-report is associated with its own beam selection and channel quality indicator, this gives the advantage on the network side, i.e., the network node side, that multiple TP may be used in the different layer transmissions to the wireless device, and the channel gain seen by different code words or beams may be largely different, since each beam has its code word and channel quality indicator. This is in contrast to current LTE specifications and CSI feedback methodology, where it is assumed that each code word is approximately equal in channel quality and where the code words are transmitted from the same TP. Here, this requirement of same TP is relaxed, so that different codewords may be transmitted from different TPs and thus have different path gains and still the CSI feedback methodology can support these larger path gain and channel quality differences.

Further advantages of some embodiments disclosed herein are discussed below.

BRIEF DESCRIPTION OF THE DRAWINGS

Examples of embodiments herein are described in more detail with reference to the accompanying drawings, in which:

FIG. 10 is a schematic diagram illustrating an example equation description of rank 8 transmission with independent code words per layer/beam, according to some embodiments herein.

DETAILED DESCRIPTION

Figure 1:
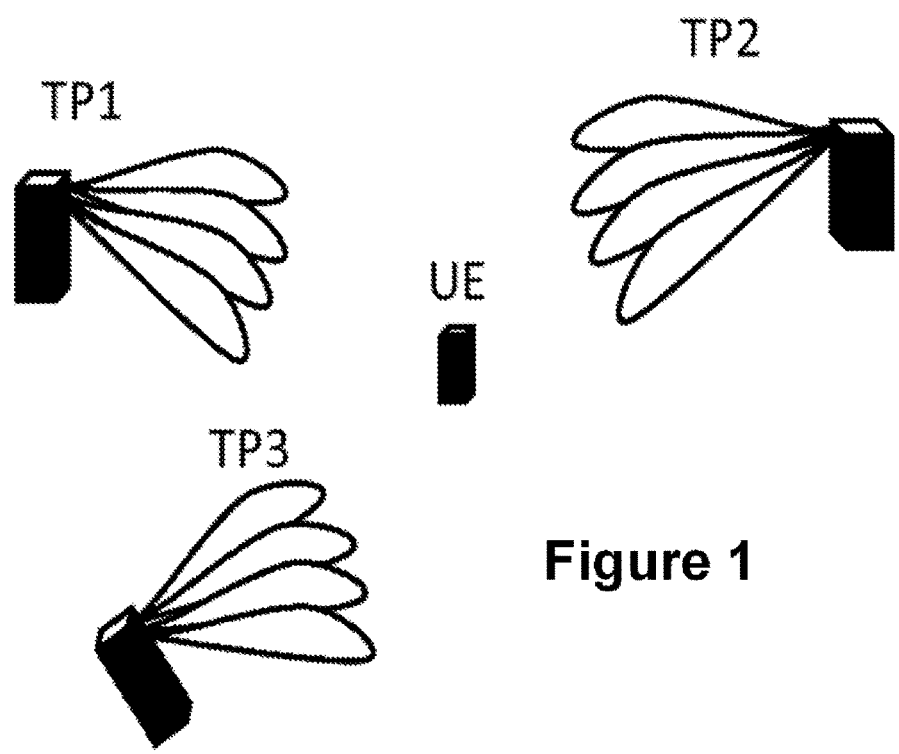
FIG. 1 is a schematic diagram illustrating a 5G system example with three TPs.
Figure 2:
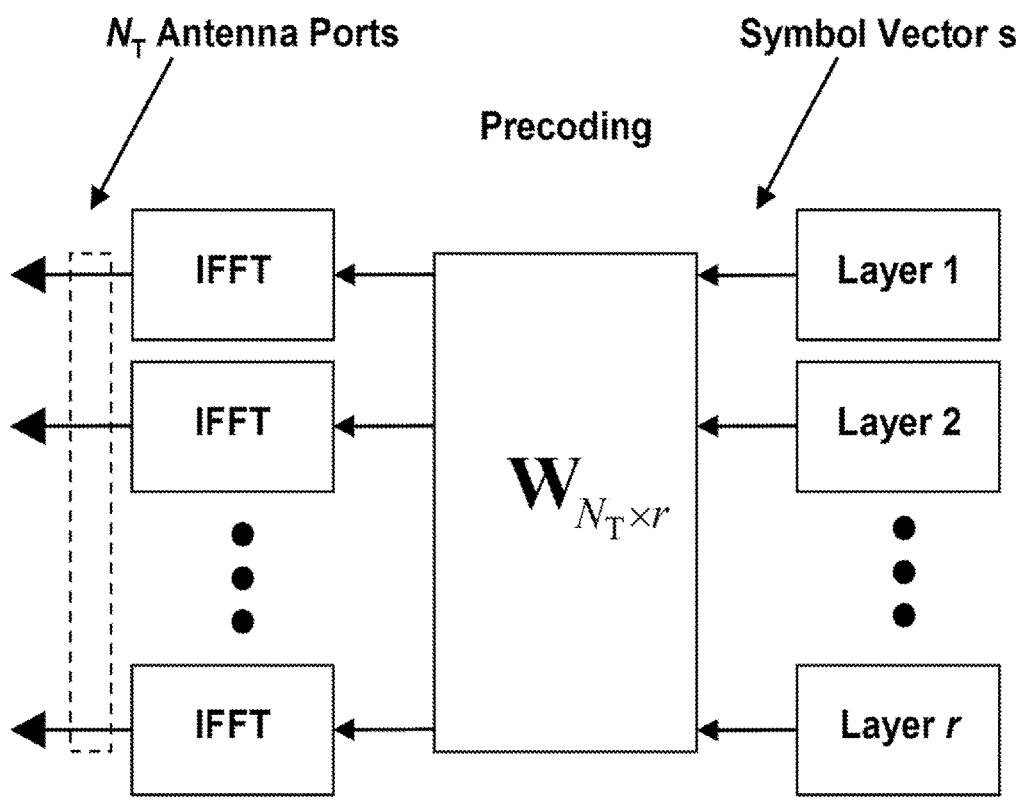
FIG. 2 is a schematic block diagram illustrating a transmission structure of precoded spatial multiplexing mode in LTE.
Figure 3:
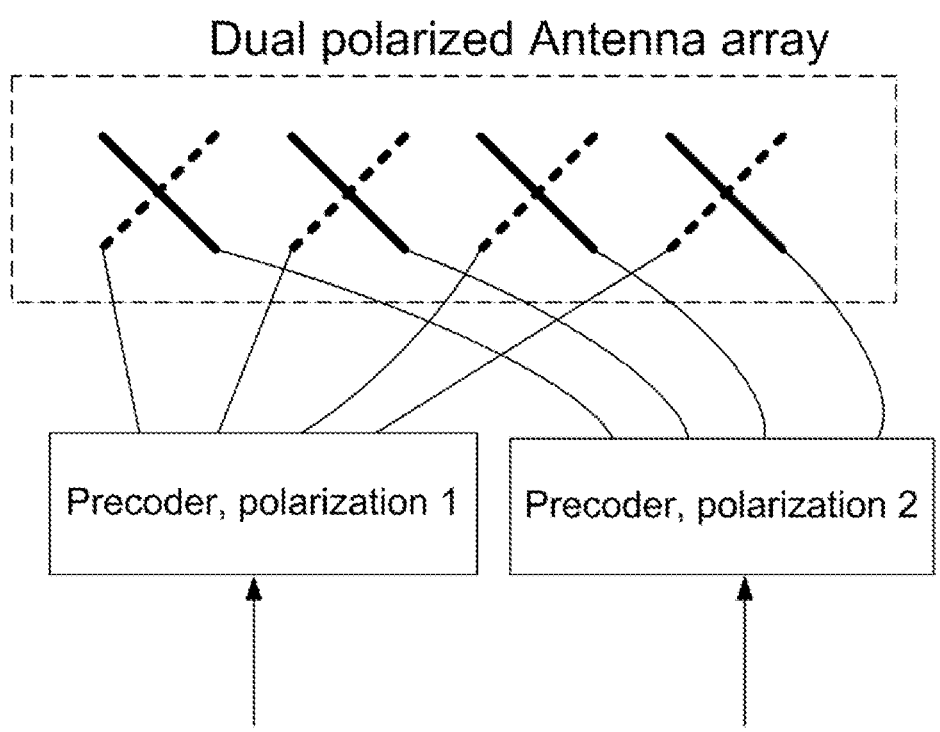
FIG. 3 is a schematic diagram illustrating a dual polarized antenna array with four antenna elements of −45 degree slanted polarization, and a second array of four antenna elements with +45 degrees slanted polarization, as well as their respective precoders.

As part of the solution according to embodiments herein, one or more problems that may be associated with use of at least some of the prior art solutions, and that may addressed by embodiments herein will first be identified and discussed.

At high, such as >10 GHz, carrier frequency in a future wireless network, the number of antenna elements at the transmitter and/or receiver side are significantly increased compared to common 3G and 4G systems, which typically operate at frequencies below 3 GHz. In such systems, the increased path loss may be compensated for by beamforming. If these beams are narrow, many beams may be needed to span the coverage area since the beamwidth is narrow.

Furthermore, a beam pointed in the Line Of Sight (LOS) propagation path may be dominant in the channel profile, and beams pointed in the directions of reflections and diffractions may commonly have significant lower beamformed channel gain compared to the LOS path. Hence, if MIMO, i.e., multi-layer, reception is desirable, a DL MIMO code-word, in case of transmission rank >2 transmitted using multiple MIMO layers, based on the existing codebook, has a suboptimal link adaptation and CSI feedback for a code word, since it needs to consider both "weak" layers and "strong" layers, within the same code word, leading to a loss in spectral efficiency, which is a problem. The ideal situation that is most efficiently using the communication spectrum, i.e., is most spectrally efficient, may be if every transmitted bit has the same signal to noise ratio. In the case described here, some bits may have much worse signal to noise ratio that others, in the same encoded code word, which leads to that the link adaptation, e.g., code rate, must be set to account for bits with both strong and weak signal to noise ratio. In practice, the code rate of a code word to meet the error rate requirement may be dictated by the lower signal to noise ratio bits, which is inefficient since the high signal to noise ratio bits may be under-utilized in a spectral efficiency sense.

The current LTE precoding codebook is designed assuming all layers, or beams, if the columns of the precoding matrix are interpreted as beamforming weights, have the same gain. The current LTE codebook for higher ranks has also been designed for rich scattering channels, where signals may be transmitted in basically any direction and still reach the receiver end. This has been reflected in the codebook design by having fewer precoding matrix candidates for high ranks and ultimately only a single precoding matrix for the highest rank.

Hence, this codebook may not be suitable for a future wireless system at higher carrier frequencies, where LOS propagation or single reflection paths may be dominant, since at higher ranks, the individual beam directions per layer are constrained into a matrix structure, that is, with a set of fixed beam directions, and thus individual beams may not be independently controlled, i.e. each beam direction may not be arbitrarily set.

Since LOS propagation may be important in such 5G networks, and a single TP with LOS connection to the UE may only support two layers, one per polarization, there is a limit on the spectral efficiency that is attainable. A way to approach this problem may be to utilize transmissions from more than one TP, where all TP have different LOS channels to the UE. Hence, more than two layers having LOS may be supported, which may increase the spectral efficiency. However, it may be a problem with this approach in the LTE codebook, that a code word may need to be split over multiple layers, which may end up in different TP, which may in turn put a burden on the latency and synchronization between the participating TP in the transmission. Furthermore, in LTE, it is assumed that the antenna ports for different layers used in a data transmission are quasi co-located, in the sense that the UE may assume e.g., the same average channel gain and delay for all antenna ports, which prohibits the use of multiple TP for different layers in a MIMO transmission.

Another problem is that the current LTE CSI feedback framework is based on the use of antenna associated reference signals, e.g., CSI-RS or CRS, and the UE selects a transmit precoding vector that combines the channels into a beamformed channel. In future radio access, such as 5G, it has been discussed to use Beam specific Reference Signals (BRS) instead, where the UE directly measures the effective channel after transmit beamforming and each of these Reference Signals (RS) represents a different beam. To feedback a preferred single beam and associated CSI is straightforward in this framework, but it is a problem how to handle higher rank CSI feedback to provide higher spectral efficiency by MIMO spatial multiplexing in 5G.

The existing CSI feedback solutions have the following problems that may be addressed in embodiments herein:

First, future wireless access, such as in 5G, is based on beamforming, and generally operates at higher frequencies, where many antennas may be required, which in turn implies narrow beam HPBW. Furthermore, the range of each TP is shorter, and this LOS propagation may become dominant.

Second, precoding codebook design and CW to layer mapping assumes all layers have approximately the same average gain and the CSI feedback is designed based on this transmitter assumptions.

Particularly for higher order, >rank 2, MIMO, this may become inefficient if layers have large channel gain imbalance, since a code word is mapped to multiple layers, which makes CSI feedback inefficient.

Moreover, higher order codebook design in existing solutions such as LTE is based on rich scattering, with less importance of precoding at higher rank. This codebook and CSI feedback is thus not optimized for LOS propagation channels in combination with high rank transmission.

Due to assumptions of co-located antennas that are used to transmit the two code-words, it is not possible to utilize more than one TP for the transmission, and thus, the CSI feedback report is not designed to cope with this transmission strategy, utilizing multiple TP.

Third, existing CSI feedback methods are based on one CSI-RS measurement reference signal per antenna port and then the UE combines the measurements of multiple antennas ports into a preferred beam using a preferred precoding vector. Hence, it is not possible to report a CQI for only a single CSI-RS antenna port.

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

Figure 8:
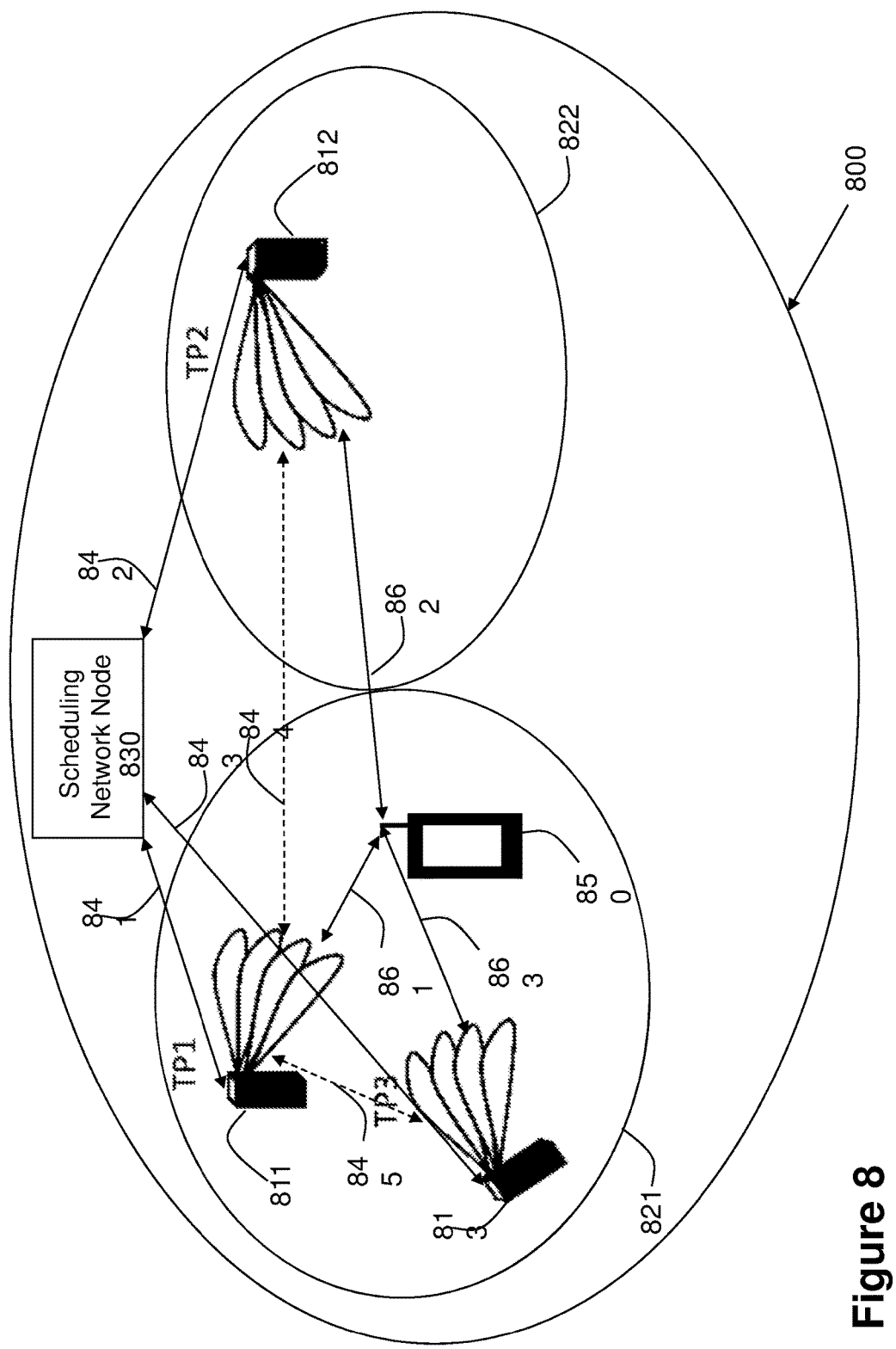
FIG. 8 is a schematic block diagram illustrating embodiments in a wireless communications network, according to some embodiments.

FIG. 8 depicts a wireless communications network 800 in which embodiments herein may be implemented. The wireless communications network 800 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system or any cellular network or system. Thus, although terminology from 3GPP LTE may be used in this disclosure to exemplify embodiments herein, this should not be seen as limiting the scope of the embodiments herein to only the aforementioned system.

The wireless communications network 800 comprises a first transmission point (TP1) 811, a second transmission point (TP2) 812 and a third transmission point (TP3) 813. Each of the TPs transmits Transmission Point (TP) beams. Each of the TPs may be, for example, base stations such as e.g., an eNB, eNodeB, or a Home Node B, a Home eNode B, femto Base Station, BS, pico BS or any other network unit capable to serve a device or a machine type communication device in a wireless communications network 800. In some embodiments, the TP1, TP2 and TP3 may be a stationary relay node or a mobile relay node.

The wireless communications network 800 covers a geographical area which is divided into cell areas, wherein each cell area is served by a TP although, one TP may serve one or several cells, and one cell may be served by more than one TP. In the non-limiting example depicted in FIG. 8, the TP1 and TP3 serve a first cell 821, and TP2 serves a second cell 822. Each of the. Typically, wireless communications network 800 may comprise more cells similar to 821 and 822, served by their respective one or more TP. This is not depicted in FIG. 8 for the sake of simplicity. Each TP may support one or several communication technologies, and its name may depend on the technology and terminology used. In 3GPP LTE, TP1 811, TP2 812 and TP3 813, may be directly connected to a scheduling network node 830. The scheduling network node 830 may be a logical function performing scheduling of the wireless devices in the wireless communications network 800 that are within the coverage of a group of coordinated TP. The physical location of the scheduling network node 830 may be in one of TP1 811, TP2 812 and TP3 813, or in a dedicated scheduling node, as depicted in FIG. 8. In some embodiments, any one or more of TP1 811, TP2 812 and TP3 813 may be realized as a Remote Radio Head (RRH) connected to a central node housing the scheduling function, i.e., the scheduling network node 830.

TP1 811 may communicate with the scheduling network node 830 over a first link 841. TP2 812 may communicate with the scheduling network node 830 over a second link 842. TP3 813 may communicate with the scheduling network node 830 over a third link 843.

Any of TP1-TP3 and the scheduling network node 830 may be referred to herein as a network node 811, 830. The network node 811, 830 controls one or more TPs, such as any of the TP1 811, TP2 812 and TP3 813.

TP1 811 may communicate with TP2 over a first radio link 844. TP1 811 may communicate with TP3 813 over a second radio link 845.

A number of wireless devices are located in the wireless communications network 800. In the example scenario of FIG. 8, only one wireless device is shown, wireless device 850. The wireless device 850 may communicate with TP1 over a third radio link 861, with TP2 over a fourth radio link 862, and with TP3 over a fifth radio link 863.

The wireless device 850 is a wireless communication device such as a UE, which is also known as e.g., mobile terminal, wireless terminal and/or mobile station. The device is wireless, i.e., it is enabled to communicate wirelessly in the wireless communications network 800, sometimes also referred to as a cellular radio system or cellular network. The communication may be performed e.g., between two devices, between a device and a regular telephone and/or between a device and a server. The communication may be performed e.g., via a RAN and possibly one or more core networks, comprised within the wireless communications network 800.

The wireless device 850 may further be referred to as a mobile telephone, cellular telephone, or laptop with wireless capability, just to mention some further examples. The wireless device 850 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device or any other radio network unit capable of communicating over a radio link in a cellular communications system. Further examples of different wireless devices, such as the wireless device 850, that may be served by such a system include, modems, or Machine Type Communication (MTC) devices such as sensors.

Terminology such as eNodeB and UE should be considered non-limiting and does not in particular imply a certain hierarchical relation between the two; in general "eNodeB", "TP" or network node 811, 830 may be considered as device 1 and "UE" or "wireless device 850" as device 2, and these two devices communicate with each other over some radio channel. Herein, the focus is on wireless transmissions in the DL, but the embodiments herein are equally applicable in the UL.

Embodiments herein describe a method for the wireless device 850 to provide feedback on a channel, e.g. CSI feedback, in a network such as wireless communications network 800, that may use Beam-specific Reference Signals (BRS) for channel measurements, e.g., CSI measurements, by defining a report, e.g., a CSI report, containing multiple sub-reports, wherein each sub-report comprises information about at least one TP beam and at least one indicator of channel quality value, e.g., a CQI value, associated with shared data channel transmission in that TP beam.

Each sub-report may correspond to one code word transmission and thus, the indicator of channel quality value, e.g., CQI, in each sub-report corresponds to one code word, i.e., every sub-report corresponds to a different code word.

Each sub-report may correspond to transmission from a different TP, e.g., TP1 811 TP2 812 or TP3 813, or different TP beams within the same TP. Hence, the effective channel gain as seen by each code word may be largely different and use independent link adaptation, therefore, the independent indicator of channel quality value, e.g., CQI.

Furthermore, despite the modularity of the proposed feedback on a channel, e.g. CSI feedback, report over multiple sub-reports, each indicator of channel quality value, e.g., CQI, value in each sub-report may be computed by taking into account the interference by selected beams associated with other code words reported in the same sub-report and associated with other code words in other sub-reports, within the same report. For example, if a UE selects two beams, i.e., two code words, and hence two sub-reports, the CQI of the first report may reflect the cross-interference from the code-words transmitted in the second beam, that is, the second sub-report, and vice versa.

Embodiments herein may solve problems in a network, such as the wireless communications network 800, consisting of one or multiple TPs, such as TP1, TP2 and TP3, where each TP has multiple antenna elements.

In the following discussion, any reference to a TP is understood to refer to any of the first transmission point 811, the second transmission point 812, unless otherwise noted.

Beamforming transmission from a TP may be achieved by precoding the transmitted signal over all or a subset of the multiple antenna elements of the TP with a complex precoding weight vector.

When many antenna elements are used at the TP, which commonly is the case in a system, such as the wireless communications network 800, operating at higher carrier frequencies, such as an anticipated 5G system, the beams may be are narrow, i.e., small HPBW, and there may be a quite large gain difference between different beams, especially if one beam has LOS pointing direction to the wireless device 850, e.g., a UE, while another has a reflection or diffraction. Furthermore, beams in broadside direction may have higher gains than beams with a large steering angle, closer to end-fire direction, due to the shape of the individual antenna element radiation pattern.

Hence, to transmit multiple layers, streams and hence beams to one wireless device 850, e.g., one UE, it may be a problem how to cope with the large channel gain differences. This was not taken into account in the design of LTE codebook and code word to layer mapping, since there, the underlying assumption in LTE is that each layer is transmitted through an effective channel with the same average channel gain.

Since the effective channel gain for each beam may be widely different, it may be desirable to map one code word to each beam, irrespectively how many beams are included in the CSI report, so that independent link adaptation per beam, and thus per code word, is obtained. An example of this is illustrated in FIG. 9.

Figures 7, 9:
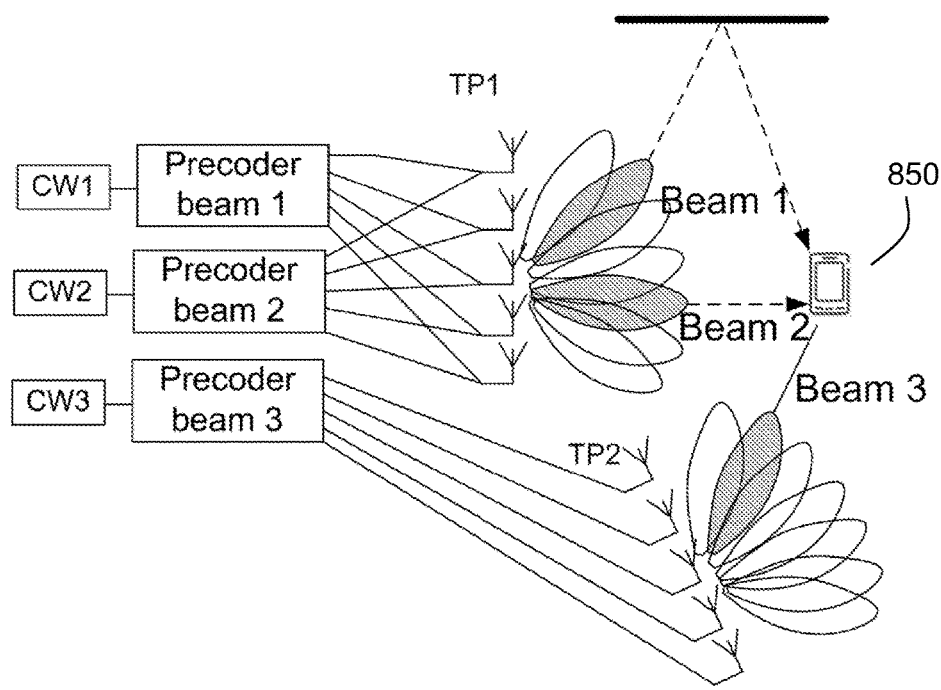
FIG. 7 is a schematic diagram illustrating a rank 8 example of LTE codeword to layer mapping.
FIG. 9 is a schematic diagram illustrating transmission to a wireless device using two TPs and a rank 3 transmission using in total three beams where each beam transmits one code word, according to some embodiments herein.

FIG. 9 illustrates two TPs, represented in the figure as TP1 and TP2, and a three beam transmission to a UE, such as the wireless device 850, represented in striped beams as Beam 1, Beam 2, and Beam 3 out of a number of beams transmitted by each of the TP1 and TP2, represented in white beams, where each beam transmits one code word, CW1, CW2 and CW3, respectively, through a respective precoder, i.e., precoder beam 1, precoder beam 2 and precoder beam 3.

Moreover, the use of multiple TPs for transmission to a single UE, such as the wireless device 850, is attractive in a network, such as the wireless communications network 800, that may be utilizing beamforming with narrow beams and with frequent LOS propagation, since multiple LOS propagation channels, may be utilized. Since a TP has a co-located antenna array, only one beam may match the LOS direction, but another TP, which is in another geographical position, may also utilize a LOS beam to the wireless device 850, arriving from another angle, thereby increasing the number of possible received layers are the wireless device 850 with high channel gain. In the example of FIG. 9, Beam 2 and Beam 3 belonging to different non co-located TP are both LOS towards the wireless device 850, as represented by the direct dashed arrows, so this wireless device 850 may experience at least two MIMO layer transmissions with good channel gain. Beam 1, on the other hand, does not have LOS towards the wireless device 850, as represented in the figure by a deflected dashed line.

Another benefit of mapping a code word to a single TP beam only is increased robustness. Since beams are narrow, and wireless devices, such as the wireless device 850, are mobile in general, a beam with good channel to the wireless device 850 may suddenly become much worse, when the wireless device 850 is moving out of the main beam pointing direction. In this case, a retransmission of this code word may be necessary, and if the code word is mapped to many different TP beams, it may be problematic to find the same number of "good" TP beams for performing the retransmission. Since embodiments herein are based on mapping a code word to a single TP beam only, the scheduler of the retransmission in the network node 811, 830 may only need to find one good TP beam for the retransmission.

In FIG. 7, which shows mapping of code words to beams in LTE for rank 8 transmission, the code word to beam, or equivalently, layer, mapping equation is shown for LTE in case of rank 8, that is 8 layer, transmission. Since there are only two code words, Code Word 1 (CW1) is mapped to four beams $x_1$, $x_2$, $x_3$, $x_4$ using precoding weight vectors $w_1$, $w_2$, $w_3$ and $w_4$. Then, Code Word 2 (CW2) is mapped to the remaining beams $x_5$, $x_6$, $x_7$, $x_8$ using precoding vectors $w_5$, $w_6$, $w_7$, $w_8$. The CQI reporting in LTE is per code word. This arrangement in LTE may have several drawbacks when deployed in the 5G scenario described above. For instance, the beam defined by the weight vector w1 and e.g. w3 may have a large gain difference, and the associated link adaptation for CW1 becomes impaired.

In some embodiments herein, we assume that each TP beam transmits an independently encoded code word. FIG. 10 illustrates an example equation description according to methodology described herein, of rank 8 transmission with independent code words per layer/TP beam. Similarly to FIG. 7, here, y is a N_T by 1 vector containing the precoded signals. $W_1 \ldots w_8$ are the N_T times 1 precoding vectors, i.e., the beamforming weight vectors, for layer 1 ... 8, respectively. $X_1 \ldots x_8$ is thus the modulated symbol transmitted on layer 1 ... 8, respectively. In this figure, $x_1 \ldots x_8$ belong, respectively to Code Words 1-8. This means that the precoder for CW1 is the sub-matrix obtained by the column $w_1$, the precoder for CW2 is the sub-matrix obtained by the column $w_2 \ldots$, etc. That is, the precoder for each codeword is the sub-matrix obtained by each $w_1 \ldots w_8$ column, respectively.

In case dual polarized antennas are used at the TP, then one sub-beam per polarization may be transmitted, where in the following, such a sub-beam is denoted a polarization beam, e.g., a sub-beam is a beam that does not utilize all available antenna elements in the array antenna at the TP, here a sub-beam may be transmitted only from the elements with the same polarization.

Figure 4:
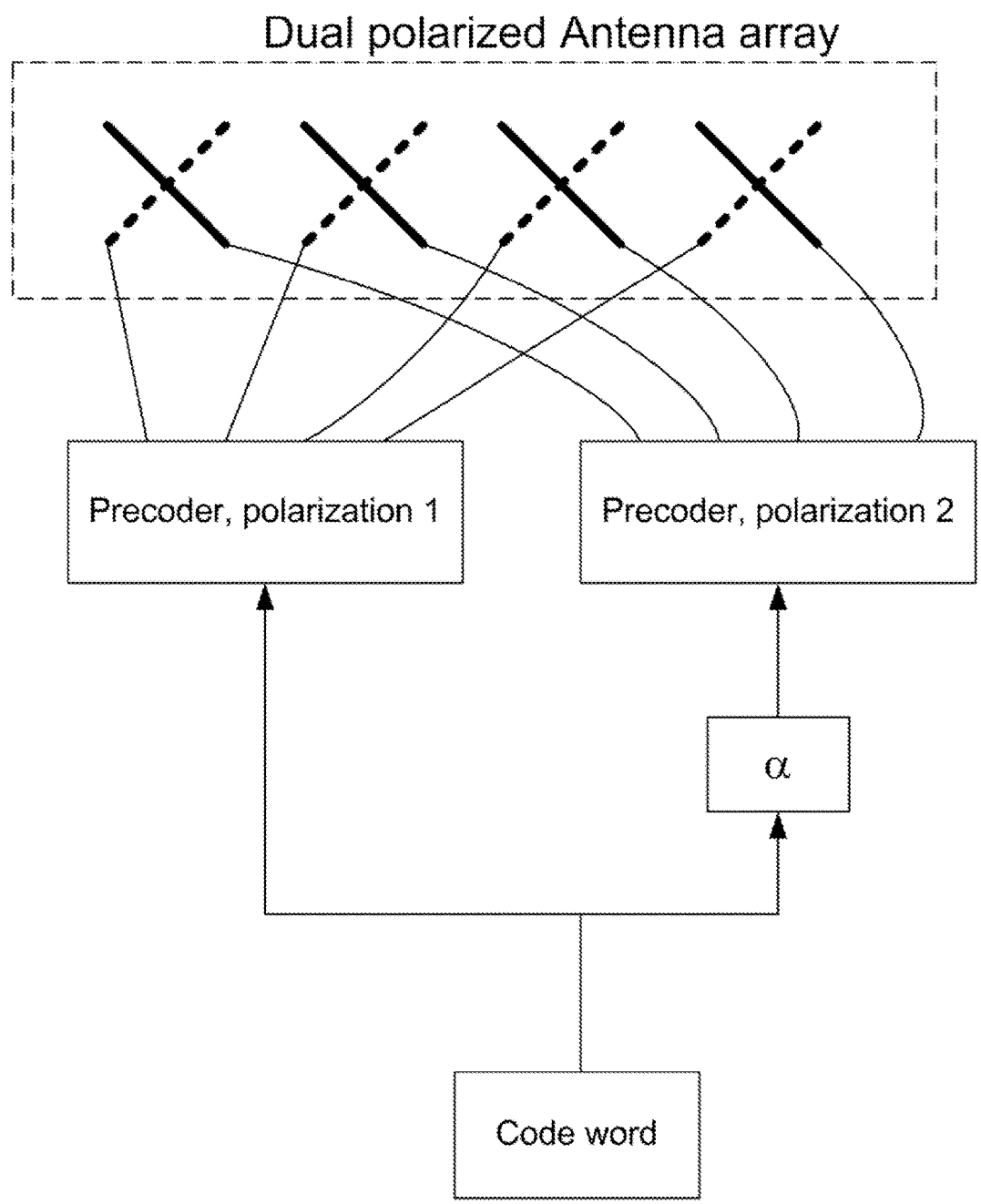
FIG. 4 is a schematic diagram illustrating transmission of a code word over a dual polarized antenna setup in LTE.
Figure 5:
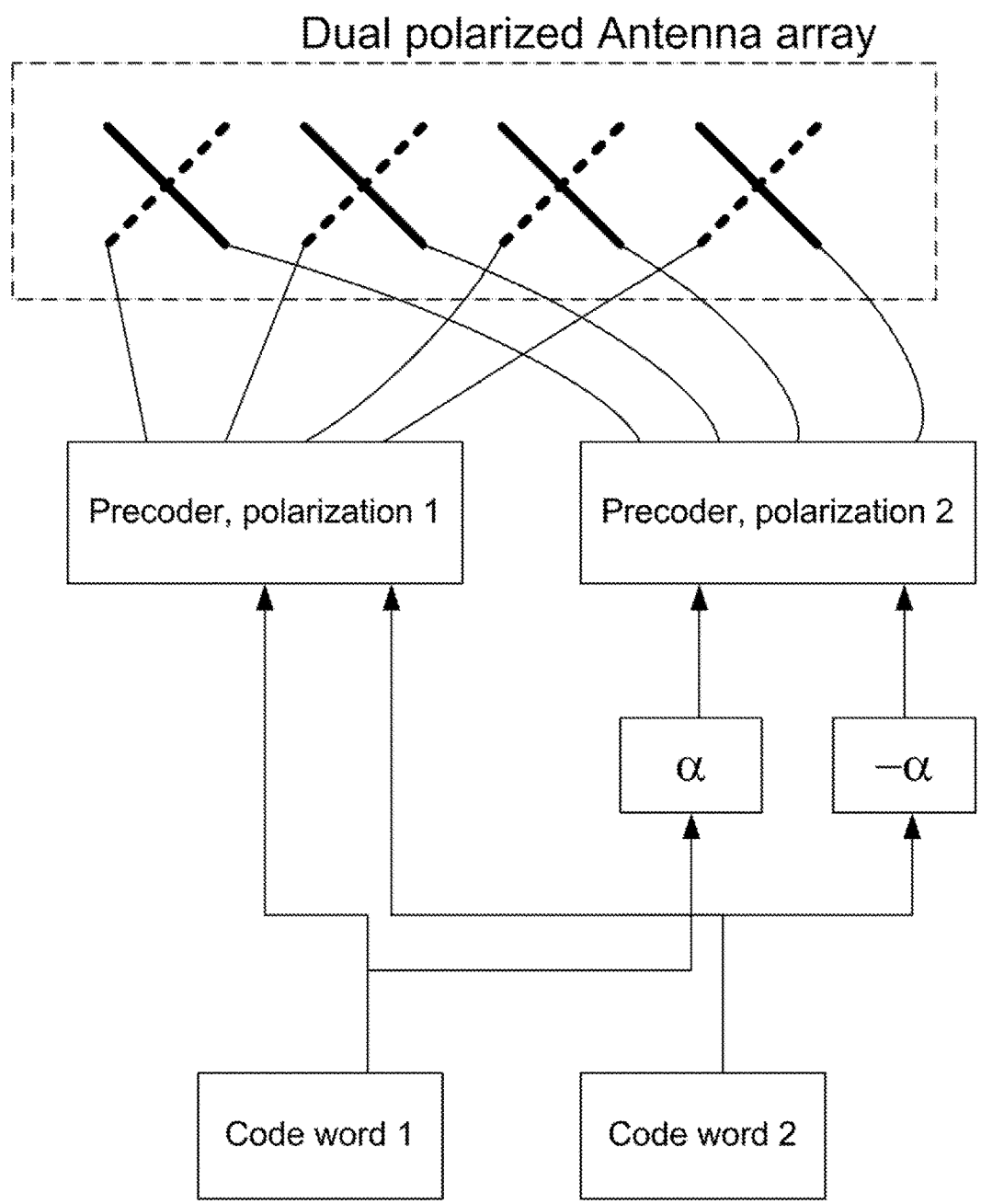
FIG. 5 is a schematic diagram illustrating transmission of two code words over a dual polarized antenna setup in LTE.
Figure 6:
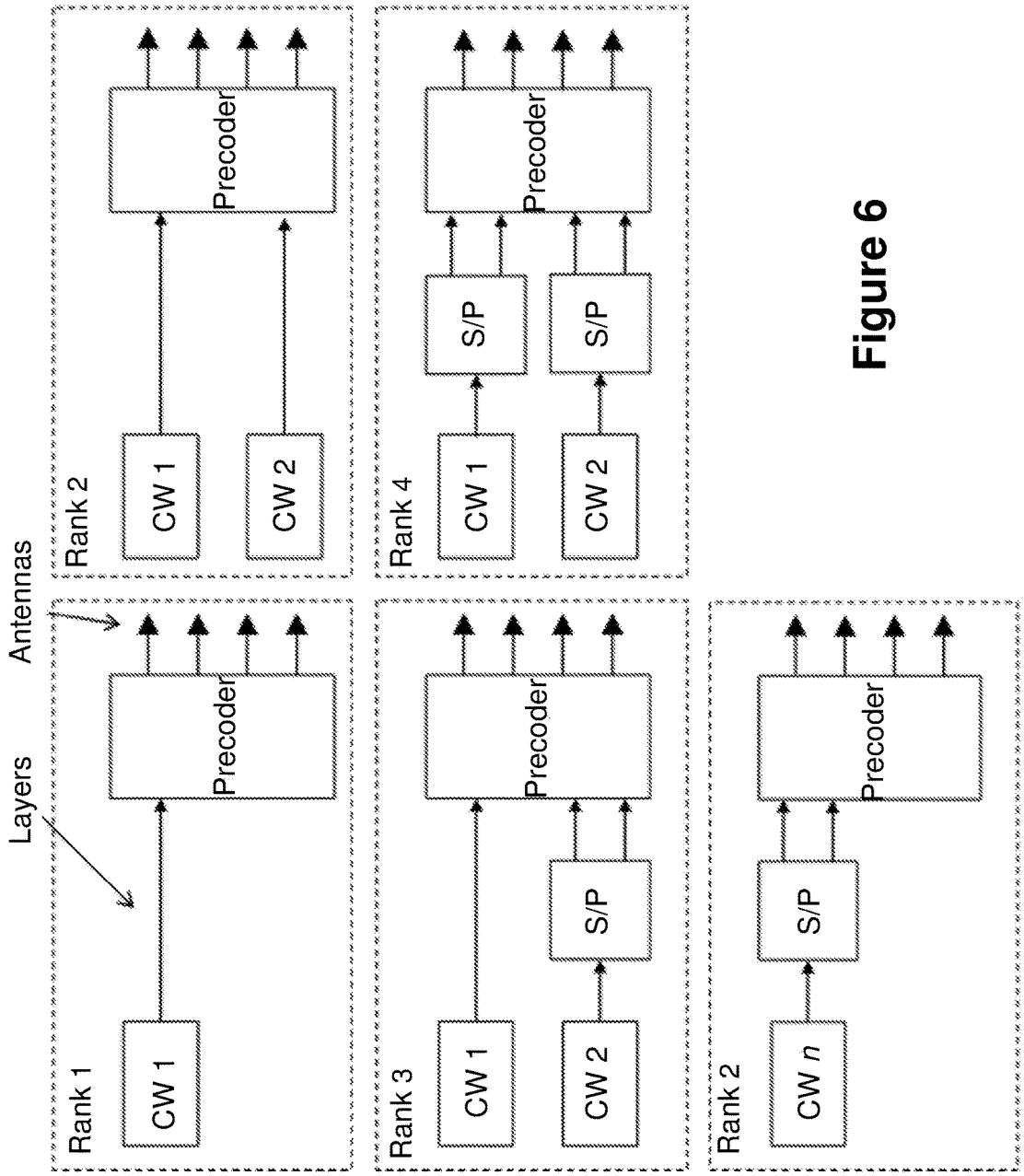
FIG. 6 is a schematic diagram illustrating a codeword to layer mapping for a four antenna system with precoding according to some LTE specifications.

Hence, a TP beam in some embodiments herein may comprise one or two polarization beams. When performing channel information feedback, e.g., CSI feedback, the polarization beams may be measurable at the wireless device 850. In case of two polarization beams, a co-phasing angle α may be used between the beams, such as in FIG. 4.

The transmitter in the network node 811, 830 may also transmit a rank 2 transmission within the same TP beam, but utilizing the different orthogonal polarization states of the two transmitted beams. Since each TP beam may comprise one or two beams obtained by utilizing two antenna polarizations, each TP beam may also be referred to herein as an "associated TP beam" as it may comprise one or two beams obtained by utilizing two antenna polarizations, i.e., polarization beams. The two polarization beams are associated with each other since they are related to each other, in this case by a co-phasing angle. An example of how this mapping to polarization beams may be described mathematically is shown in equation (3), where the same beam is used for both polarizations but the precoding matrix $$\begin{bmatrix} 1 & 1 \\ \alpha & -\alpha \end{bmatrix}$$

ensures orthogonality between the two polarization beams. Measurement evidence and laws of physics have shown that different polarization states of the same TP beam commonly may have approximately the same average gain, although there are exception cases, such as when a ray is reflected at the polarization angle, also known as the Brewster angle, in which case the reflected TP beam has a single polarization, or in the case the receive antenna in the wireless device 850 arrangement has a single polarization and is aligned with one of the transmit polarizations in a line of sight channel, so some embodiments herein assume that a single code word is mapped across the two polarization states within the same TP beam.

Figure 11:
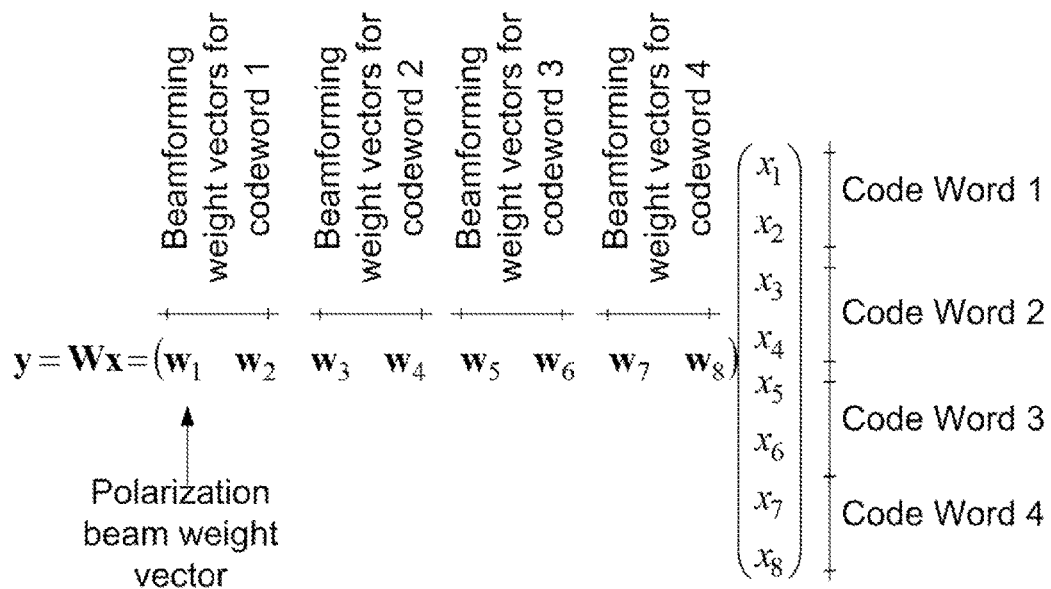
FIG. 11 is a schematic diagram illustrating an example equation description of rank 8 transmission example with 4 code words, where two polarization beams belong to the same TP beam, and a codeword is mapped to each TP beam individually, according to some embodiments herein.

Hence, all modulated symbols in a code word may have approximately the same channel gain, since they are transmitted in the same TP beam, but potentially different polarization beams within that TP beam. The modified equation that may express this for rank 8, and where all code words are mapped to two polarization beams each is given in FIG. 11. FIG. 11 illustrates a Rank 8 transmission example with 4 code words, where e.g., w1 and w2 are two beams obtained using the two polarizations, and belonging to the same TP beam, for example obtained as the resulting columns in equation (3). A codeword, when transmitted, may then be mapped to each TP beam individually, since each group of two precoding vectors may define the sub-rank 2 precoding of a code word. The number of layers within a TP beam is denoted the sub-rank of the transmission, where sub-rank may be defined within the TP beam. If there are two polarization beams per TP beam, the sub-rank may be 1 or 2.

In other embodiments, some of the code words may be mapped to a single TP beam, while others mapped to two polarization beams within the TP beam. The total transmission rank, or number of layers, is the sum of the sub-rank of each of the used TP beams. The use of sub-rank adaptation may be useful, since a TP, such as any of the first transmission point 811, the second transmission point 812 and the third transmission point 813, that participates in the transmission, may have poor or zero channel gain for one of the polarizations, and transmission may in this case only utilize a single polarization beam. Alternatively, the TP may have only linear polarized antennas, and thus only sub-rank 1 may be used for the TP beam.

Embodiments herein will now continue to describe the feedback on a channel, e.g. CSI feedback, methodology that may be utilized to support link adaptation for the transmission schemes outlined above.

The principle of channel information feedback, e.g., CSI feedback, as outlined in some embodiments herein is that the wireless device 850 may measure the effective channel for each configured polarization beam. This may be done, e.g., using the configured antenna port associated with that beam, where an antenna port may define a reference signal as in LTE. Based on some criteria, such as e.g., maximum throughput or maximized mutual information, the wireless device 850 may select the number of TP beams it may receive simultaneously. If too many beams are selected, the inter-beam interference may not be handled by the UE and the throughput may degrade. If too few are selected, the throughput may be unnecessary low, since the spatial reuse is low. Therefore, there may be an optimal number of beams that the UE may select, and recommend to the network that it can support for the subsequent data transmission. For each TP beam, the wireless device 850 may select the preferred sub-ranks, which is the number of simultaneous polarization beams it may receive with the TP beam.

Figure 12:
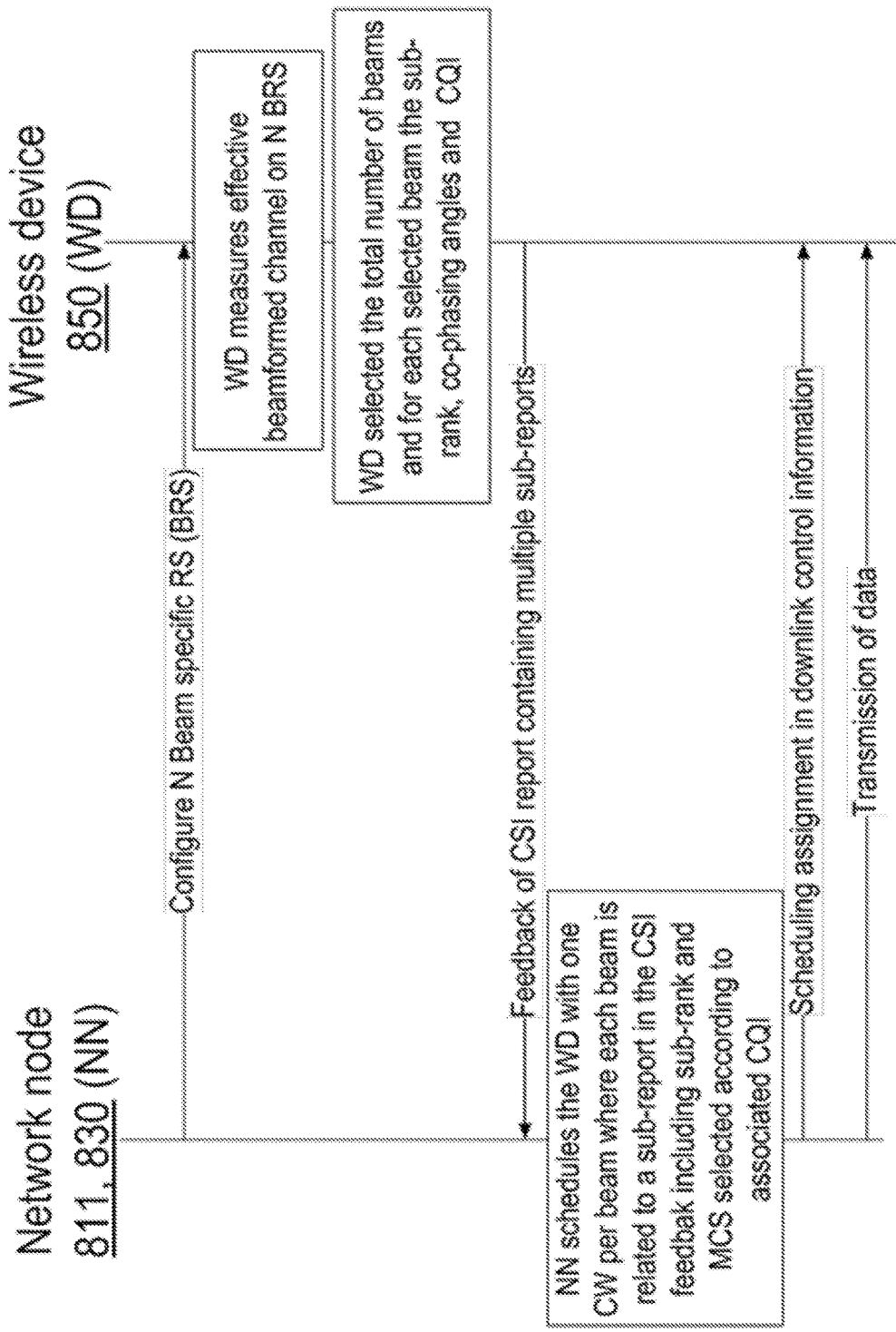
FIG. 12 is a schematic diagram illustrating embodiments of a method in a wireless communications network involving a network node and a wireless device, according to some embodiments.

The total rank, or number of layers, may thus be given as a sum of the sub-ranks numbers across all selected TP beams. Moreover, the wireless device 850 reports an indicator of channel quality value, e.g., a CQI value, indicated per TP beam, since a code word may be mapped to each TP beam, and the report, e.g., CQI report, may take into account interference from other TP beams, including the polarization beams, as selected in the report. The wireless device 850 may then feed back this information in a report, such as a CSI report. The network node 811, 830 then may decide on scheduling the wireless device 850, and may perform the link adaptation, e.g., selection of sub-rank, the TP beams, and the Modulation and Coding Scheme (MCS) per TP beam. It may send a scheduling message in a DL control channel, which may also include at least the scheduled resource blocks, and the associated scheduled DL shared data channel. FIG. 12 illustrates a flowchart describing some principles of some examples of embodiments herein.

It may be further assumed that each TP may transmit polarized BRS, in some or all possible polarization beams. Hence, different measurement antenna ports, e.g., CSI measurement antenna ports, may be assigned to each polarization beam. These BRS may be transmitted simultaneously, or they may be time or frequency multiplexed. In any case, the used set of transmitted BRS signals, i.e, antenna ports, may be orthogonal, so that the wireless device 850 may perform channel estimation per BRS with low interference from other BRS.

Figure 13:
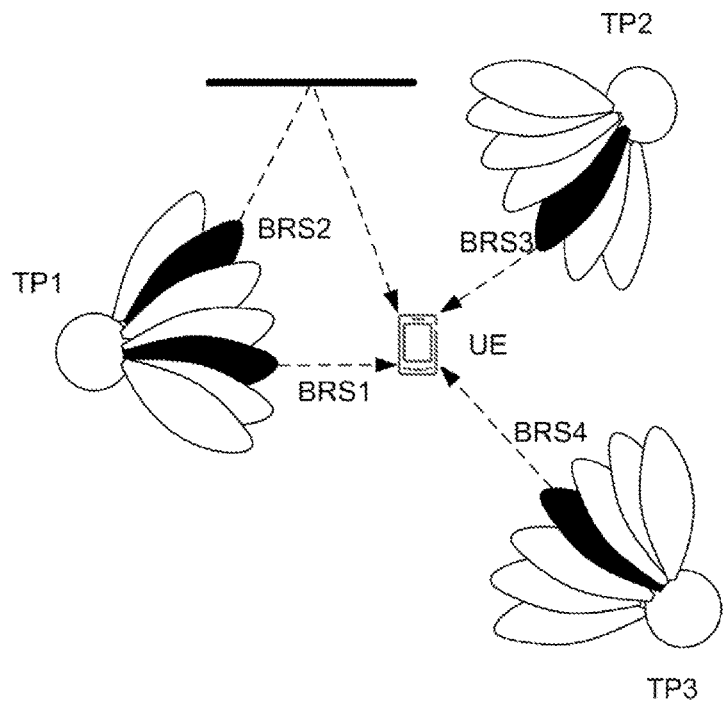
FIG. 13 is a schematic diagram illustrating an example embodiment in a 5G system with three transmission points (TP1,TP2,TP3) and the wireless device, wherein each TP utilizes beamforming for transmission.

In the general case, more than one TP may transmit BRS in their corresponding TP beams. An example is shown in FIG. 13. FIG. 13 illustrates an example of a 5G system with three TP, represented in the figure as TP1-TP3, and the wireless device 850, represented in the figure as "UE". Each TP in this figure utilizes beamforming for transmission. In the figure, four BRS, BRS1-BRS4, are transmitted from the three different TP, in four different TP beams, represented in the figure as black lobes. White lobes in the figure represent other TP comprising other BRS, also beams transmitted by TP1-TP3 that the wireless device 850 either does not detect, or finds less useful by some criteria, since they are pointing in a less useful direction, and thus have too low channel gain to the wireless device 850. The wireless device 850 measures the effective channel for each of the four beams. This figure shows an example with one polarization beam per TP beam, since there is one BRS per beam in this figure. BRS1, BRS3 and BRS4 are transmitted with LOS to the wireless device 850, as represented by direct dashed lines. BRS2 is transmitted without LOS to the wireless device, as represented by a deflected dashed line.

This is different from LTE in several aspects; first, in LTE, antenna specific RS are used, e.g., CSI-RS or CRS, which are not beamformed in general, in the sense that the same signal is transmitted from multiple phase controllable antenna elements. The UE selects a precoder from a codebook that combines the multi-antenna channels into a beam, effectively giving a beamformed channel. Hence, the UE selects the antenna weights that would create a beam. In embodiments herein, the precoding vector that generates each beam may instead be transparent to the wireless device 850, since the UE may directly measure the effective beamformed channel by the use of BRS. Hence, the BRS may be transmitted from multiple antenna elements with an associated precoding weight that results in a beam. Since the UE may measure the BRS, it is now aware of the precoding weight used, that is, it is transparent to the UE, as it measures directly the result of the precoding. Secondly, in LTE, all beams must be assumed to come from a a same TP, reception of one code word from one TP and another code word from a second TP, simultaneously, is not supported, due to the quasi co-location assumptions specified in LTE. If the UE cannot assume that the reference signal associated with each beam, e.g., BRS,CSI-RS and DMRS, is not quasi co-located, then it gives the network freedom to transmit multiple beams to the UE that may be transmitted from different TPs which are not co-located.

In LTE, UE feedback is a one of a fixed set of precoder matrices containing beamforming weights for antenna ports. The channel measurement performed from one antenna port reflects the non-beamformed channel from that antenna element to the UE. The measurements do not allow the distinction of individual—polarization—beams, and they do not allow to adaptively change the weight values of individual ports. In contrast, in embodiments herein, a UE may directly measure and feedback per polarization beam, of a subset of beams selected by the UE, e.g., due to the fact that they provide the best signal. There may be no need to use a codebook of potential beams to find the best beam to use. The UE may find the best beam by simply measuring the power of the reference signal associated with the beam. An advantage of the embodiments herein may therefore be that beams are not defined by a standardized codebook. The network may shape the beams in any way it may desire, to meet the particular deployment where the base station is situated. For instance, if in front of a skyscraper, it may be useful to generate multiple beams in vertical angle domain to cover a UE on the upper floors. Since the UE may measure on a beamformed reference signal, it may be unaware of the actual beam weights. Another advantage is UE complexity, since codebook search is computationally consuming. Embodiments herein may provide the advantage that the UE may measure the power of a reference signal instead of getting an estimate of the benefit of a certain beam. That is, without the need for channel matrix times codebook vector multiplication.

In LTE, UE feedback has one channel state indicator per codeword over several beams. For example, in a 4 layer transmission, the first codeword is mapped to the first two beams and the second codewords is mapped to the two remaining beams. The UE feeds back CSI per codeword, which implies it feeds back a joint CSI for the two first beams and another for the second two beams. If the number of beams is increased even further, the number of codewords is still two. In case of eight beam transmission, the first CSI reflects the first four beams and the second CSI reflects the channel quality of the last four beams, i.e., beams 5-8. It has been assumed herein that a column of a precoding matrix is the precoding vector that defines a beam. In contrast, in embodiments herein, a UE feedback may have one channel state indicator per codeword and thus, also per beam, irrespectively of how many beams are included in the CSI report. Embodiments herein may provide the advantage that the UE feedback may allow for adjustment of transmission parameters, that is, link adaptation, per beam, to optimize transmission of the codewords. In LTE, there are maximally two CSI reports even though there may be more than two beams. This means that one CSI may reflect transmission quality over multiple beams that potentially are transmitted from different TPs. Since these qualities may be vastly different, the link adaptation may need to adjust for the worst beam, which is inefficient. Embodiments herein address this by allowing for link adaptation, and thus CSI feedback, to be independent per beam The wireless device 850 may thus estimate the effective channel $g_{rn}$, which is a complex number describing the amplitude and phase of the channel that may be obtained when performing channel estimation from BRS-n, that is, from the Beam Specific Reference signal n, to receive antenna r, where r=1, . . . , R, where R is the total number of receive antennas that at the wireless device 850. If there is LOS propagation between the TP, and the wireless device 850, the amplitude of the estimated channel $g_{rn}$ using the associated BRS-n for the beam that is pointing towards the wireless device 850, may be be large compared to channel amplitudes estimated from other BRS.

A common TP deployment may be to utilize dual polarized transmit antennas. In this case, a BRS may be transmitted in each polarization beam, giving rise to estimated effective beamformed channels, potentially the wireless device 850 may estimate these for each frequency subband, $g_{rn}$ and $g'_{rn}$ for each of the two polarization beams, i.e., measured on the two associated antenna ports, respectively.

Since the BRS may be beamformed, the wireless device 850 may not know the beamforming weights used on each participating antenna element to generate the TP beam, it may simply measure the effective channel, as if it was a single transmitting antenna, with the antenna element pattern corresponding to the TP beam shape. In the case of dual polarized antennas, the wireless device 850 may combine the two polarized beams into a single TP beam, by the application of the co-phasing angle $\alpha$. In this case, the effective channel, after co-phasing, may be a sum of the two estimated channels, where the second complex channel estimate is rotated an angle $\alpha$ by multiplying with $\exp(j\,\alpha)$, where e is the exponential function and j is the square root of minus one:

$$g''_{rn} = g_{rn} + g'_{rn} e^{j\alpha} \quad (3')$$

Hence, if the TP transmits a code word in the two dual polarized beams with index n, then this code word may propagate through this channel (3'). Hence, the wireless device 850 may, by feeding back the co-phasing angle α, change the effective channel and improve it, e.g. by maximizing the magnitude of the effective channel $g''_m$ in TP beam n. Therefore, the co-phasing angle may be included in the report, e.g., the CSI report, so that, e.g., channel gain may be maximized.

Figure 14:
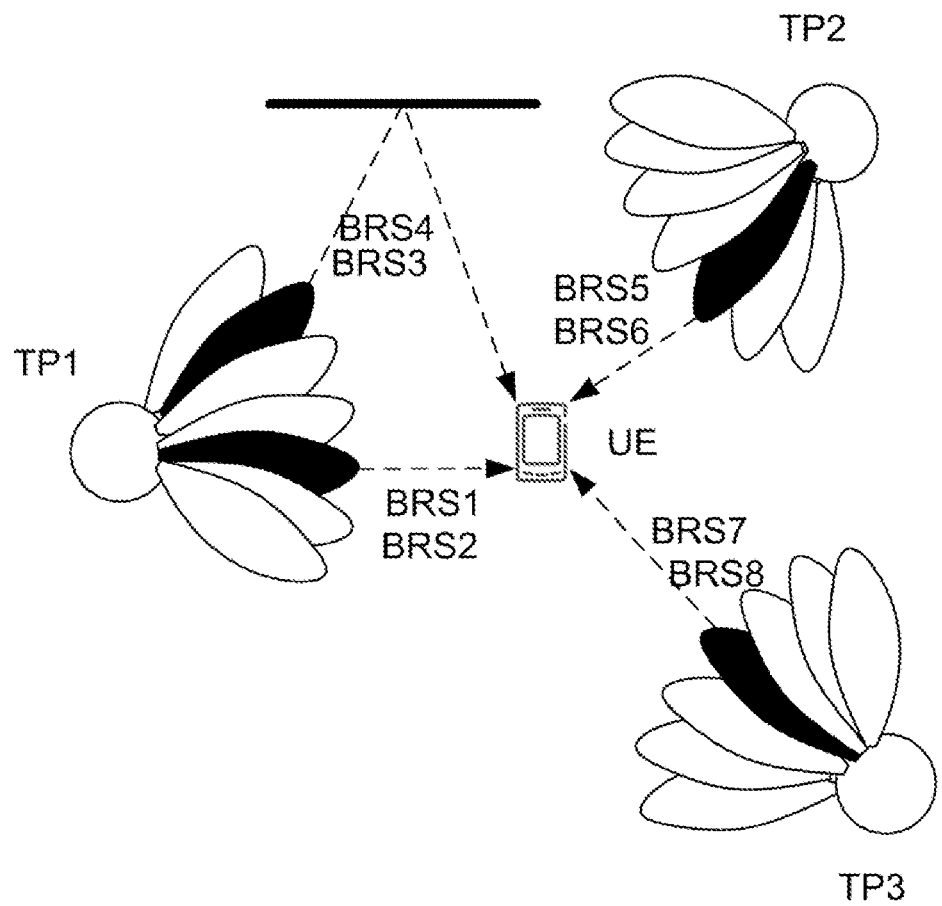
FIG. 14 is a schematic diagram illustrating an example embodiment in a 5G system with three transmission points (TP1,TP2,TP3) and the wireless device, wherein each TP utilizes dual polarized beamforming for transmission.

An example of this is illustrated FIG. 14. FIG. 14 illustrates an example of an embodiment of a 5G system with three transmission points, represented in the figure as TP1, TP2, TP3, and the wireless device 850, represented in the figure as "UE". Each TP utilizes dual polarized beamforming for transmission, where the two BRS in each pair, {n,n+1} for n=1,3,5,7 corresponds to different polarization beams within each TP beam, represented in the figure as black lobes. In the figure, the white lobes represent other TP beams transmitted by TP1-TP3 that the wireless device 850 either does not detect or finds less useful by some criteria, since they are pointing in a less useful direction and thus have too low channel gain to the wireless device 850. Pairs 1-2, 5-6 and 7-8 have LOS to the wireless device 850, as represented by the direct dashed lines. Pair 3-4 does not have LOS to the wireless device 850, as represented by a deflected dashed line.

Embodiment 1

To support link adaptation for the transmission scheme outlined herein, the wireless device 850 may e.g., feed back a report on channel information to the network node 811, 830, e.g., a CSI report, comprising one or multiple sub-reports, where each sub-report reflects the channel information, e.g., CSI, for one code word, and which may comprise one or multiple of the following components:

a) A BRS selection indication, to identify to the network by signaling the indices of the BRS which are associated beam/s of one or two polarization beams of the particular TP beam in the sub-report, for the given code word. Hence, the UE may measure on multiple BRS, each associated with a beam, and perform a selection of one or multiple desirable beams, for instance, those beams with the largest received measured power. Then, it may report the indices of those BRS sequences to the network. The UE may not know how these beams are pointing, it may merely inform the selected, preferred BRS. As stated earlier, each TP beam may be also referred to herein as an "associated TP beam" as it may comprise one or two polarization beams. Equivalently, this selection indication may indicate the antenna port for each polarization beam. The indication may thus be an index to two antenna ports. Alternatively, the indication may give a first antenna port index, n, and then the second antenna port in case of sub-rank 2 feedback is implicitly understood as antenna port in n+1.

b) A sub-rank indicator estimated by the UE for a given associated beam. Since an associated beam may contain up to two beams, one per polarization, there is a possibility to send two layers of information in this beam, utilizing the two antenna polarizations. When this is the case, the UE may report sub-rank two, otherwise, sub-rank one. Alternatively, if there are no polarization beams for this sub-report, i.e. if the maximum sub-rank is 1, then this report may be excluded to save control signaling overhead.

c) An indicator of channel quality value, e.g. a CQI, for the code word that is assumed to be transmitted in the selected TP beam. If multiple sub-reports are reported in the report, e.g., the CSI report, then the indicator of channel quality value, e.g., the CQI may be differentially encoded with respect to e.g. the first sub-report indicator of channel quality value, e.g., CQI, to save control signaling overhead. The indicator of channel quality value, e.g., CQI is computed taking into account the selected sub-rank. When a beam has sub-rank two, that is, two layers are transmitted utilizing the two polarizations, it may be assumed here that a single code word is transmitted, and thus mapped to two layers within the beam, as represented in FIG. 11. Hence, there may only be a single CSI reported, irrespectively of whether the sub-rank is one or two, since it may always only be a single code word in this beam, and CSI relates to a code word, not to a layer. The indicator of channel quality value, e.g., CQI, may also be computed, taking into account the rank and channel estimates of the selected TP beams in the other sub-reports in the report, e.g., the CSI report. Hence, the indicator of channel quality value, e.g., CQI, of each TP beam may be in this case jointly estimated, taking into account the mutual interference across TP beams.

d) Co-phasing information for channels estimated using the BRS, for instance on the preferred co-phasing angle between two polarization beams/antenna ports. This co-phasing information may be reported per subband, i.e., multiple angles are reported, to follow the frequency dependent variations of co-phasing angle. The co-phasing may also be taken from a codebook such as {0, 90, 180, 270} degrees, thus represented by 2 bits. In case of sub-rank 2, a matrix, such as the right matrix of equation (3) may be used to co-phase the polarization beams. In this sub-rank 2 case, each layer, which corresponds to a given column of the matrix, may be mapped to both polarizations, but with different phase angles alpha and -alpha.

In the report, e.g., the CSI report, described in some embodiments herein, one antenna port per polarization beam may be used for measurements, to derive a beneficial co-phasing angle, in the sub-rank 1 feedback case. In the sub-rank one case, both polarizations may be used for transmitting the same message, but the co-phasing angle alpha indicates a beneficial phase shift of the transmission of the second polarization relative to the first polarization, as represented FIG. 4. However, when performing the actual shared data channel transmission using rank 1, only a single DMRS antenna port may be needed in the demodulation, since the code word in this case may be transmitted simultaneously over the two polarization beams and a single DMRS antenna port, transmitted in the same way as the single layer data, may be sufficient to demodulate the rank 1 code word.

Embodiment 2

Figures 15, 16:
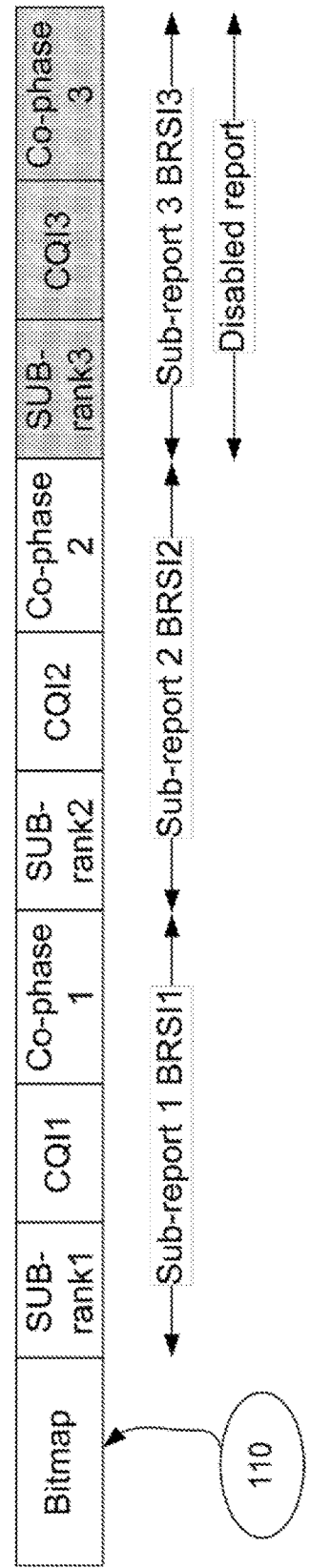
FIG. 15 is a schematic diagram illustrating an example of a report according to embodiments herein.
FIG. 16 is a schematic diagram illustrating an example of a report according to embodiments herein.

In an extended embodiment, which is an extension of embodiment 1, the reports, e.g., the CSI reports, may comprise an indicator on how many sub-reports the report, e.g., the CSI report, comprises. Hence, the wireless device 850 may first decode the indicator, to detect the size of the report, e.g., the CSI report, and may then proceed to decode each individual sub-report. The number of sub-reports is related to the rank, since each additional sub-report is related to an additional code word, having rank 1 or 2. FIG. 15 illustrates an example of a report, which in this example is a CSI feedback report, comprising three sub-reports, each with an individual Beam Reference Selection Indicator (BRSI), which may indicate one or two polarization beams, or antenna ports, an associated indicator of channel quality value, here a CQI, a co-phasing indication used if two polarization beams are selected by BRSI, and a sub-rank indicator. Each sub-report in this example corresponds to a transmitted code word, and if all sub-ranks indicate rank 2, then a total rank of 6 is fed back in the CSI report.

In an alternative embodiment, the report, e.g., the CSI report, size is fixed, and it may comprise a number of sub-reports that is known to the wireless device 850 and network node 811, 830. This may for instance be related to the number of configured BRS/antenna ports that the wireless device 850 may measure on, i.e., the wireless device 850 may measure and report on all configured beams. In this case, the field "number of sub-reports" may not be needed and also the field BRS index may not be needed, since the report, e.g., the CSI report, may comprise fields for all configured BRS.

Having a fixed size of the report, e.g., the CSI report, may have the benefit that the there may be no need to blindly detect the report, e.g., the CSI report, depending on the payload size of the Uplink Control Information (UCI) message. The UCI may simply have the same payload size, irrespectively of the rank. Since the number of sub-reports in these embodiments is fixed, it may be possible to disable sub-reports, whenever the rank feedback is lower than the maximum rank, i.e., some beams/BRS that may not useful for the wireless device 850. Since the report size may be fixed, it may to have room for the maximal number of possible sub-reports, i.e. beams. If the UE chooses not to select the maximal number of allowed beams, some of the sub-reports fields in the feedback report will be unused.

The indication of "unused" beams, or equivalently, sub-reports, in the CSI feedback report, may be done in various ways, one way is by disabling all transport blocks in the unused sub-reports, e.g., by signaling to the network node 811, 830 that the transport block is "disabled" in the corresponding CQI in the sub-report, or by indicating rank zero in the corresponding sub-rank in the particular sub-report. Another way may be to indicate, in the report, e.g., the CSI report, for each configured BRS, whether the beam/BRS is active or not, using a bitmap that is included in the report, e.g., the CSI report.

FIG. 16 illustrates an example of an embodiment of a CSI feedback report with a fixed UCI payload, containing three sub-reports, one for each BRS, but where a bitmap indicates which sub-reports are active. That is which sub-reports contain actual feedback, in contrast to disabled sub-reports. These active sub-reports are represented with white background boxes in the figure. The bitmap may also indicate which sub-reports are disabled, represented by the dotted boxes in the figure. The information bits in the disabled sub-report may be set to a pre-defined value, e.g. all zeros. In this figure, the bitmap is "110" that indicates that sub-report 3 has been disabled.

Embodiment 3

In other embodiments, increased implementation flexibility on the network side is accounted for in the sense that different TP may have different antenna configurations. Hence, the number of BRS antenna ports per TP may be signaled to the wireless device 850 by higher layer signaling, e.g. by a Radio Resource Configuration (RRC) message. This may be done at the same time as when configuring the wireless device 850 on which BRSs to perform reporting, e.g., CSI reporting, on.

Some TPmay have dual polarized antennas, and may thus be configured with two BRS antenna ports per TP beam. Other TP may only have a single polarization antenna, that is, a single antenna port, or some other antenna arrangement, that requires only a single BRS antenna port. Hence, the suggested signaling may inform the wireless device 850 about which channel measurements have two BRS antenna ports and may thus be co-phased in a single sub-report, and for which sub-rank may be reported since it may be one or two, and which BRS—beam specific reference signals—that only consist of a single beam, a single BRS antenna port, and thus only rank 1 is possible. In this case, no co-phasing term is needed in the report. In Table 1, an example of what may be comprised in such RRC message is exemplified. Here, the wireless device 850 is configured with three BRS to perform CSI measurements on. These are assigned different antenna port numbers, 200, 201, 202 and 204 respectively, where each antenna port defines which BRS to measure on. Information is also given that BRS#0 actually comprises two different polarization beams within the same TP beam, so the wireless device 850 may perform co-phasing of the channels measured on BRS antenna port 200 and 201 in this example.

However, port 202 and 204 may not be co-phased, since they belong to different beams and may also be transmitted from different TPs. So the report, e.g., the CSI report, for the wireless device 850 in this example comprises maximally three sub-reports, since BRS#0 contains two BRS antenna ports, that is two reference signals for measurements, each associated with a polarization within the same beam, mapped to the same sub-report. But the two other beams only have a single polarization. Thus, BRS#1 and BRS#2 only have a single BRS antenna port each.

In general, the configuration of the wireless device 850 may comprise a set of BRS, their corresponding identity, and information of which BRS—beam specific reference signals—that may be considered in a sub-report, which may include rank and co-phasing information, and which BRS—beam specific reference signals—that may be considered as solitary.

The configuration may also include information about the set of allowed ranks per sub-report in case the TPmay want to restrict the rank to e.g. one for all sub-reports.

TABLE 1

Example of configuration message from the network node 811, 830, e.g. by RRC, of BRS to the wireless device 850, where in this example four BRS antenna ports have been configured

| BRS number | BRS Antenna port | Co-phasing info |
|---|---|---|
| 0 | 200 | Co-phased with port 201 |
| 0 | 201 | Co-phased with port 200 |
| 1 | 202 | Not co-phased with any other port |
| 2 | 204 | Not co-phased with any other port |

The configuration may be signaled by RRC configuration, or may be dynamically triggered in an aperiodic report trigger, signaled in a DL message.

Figure 17:
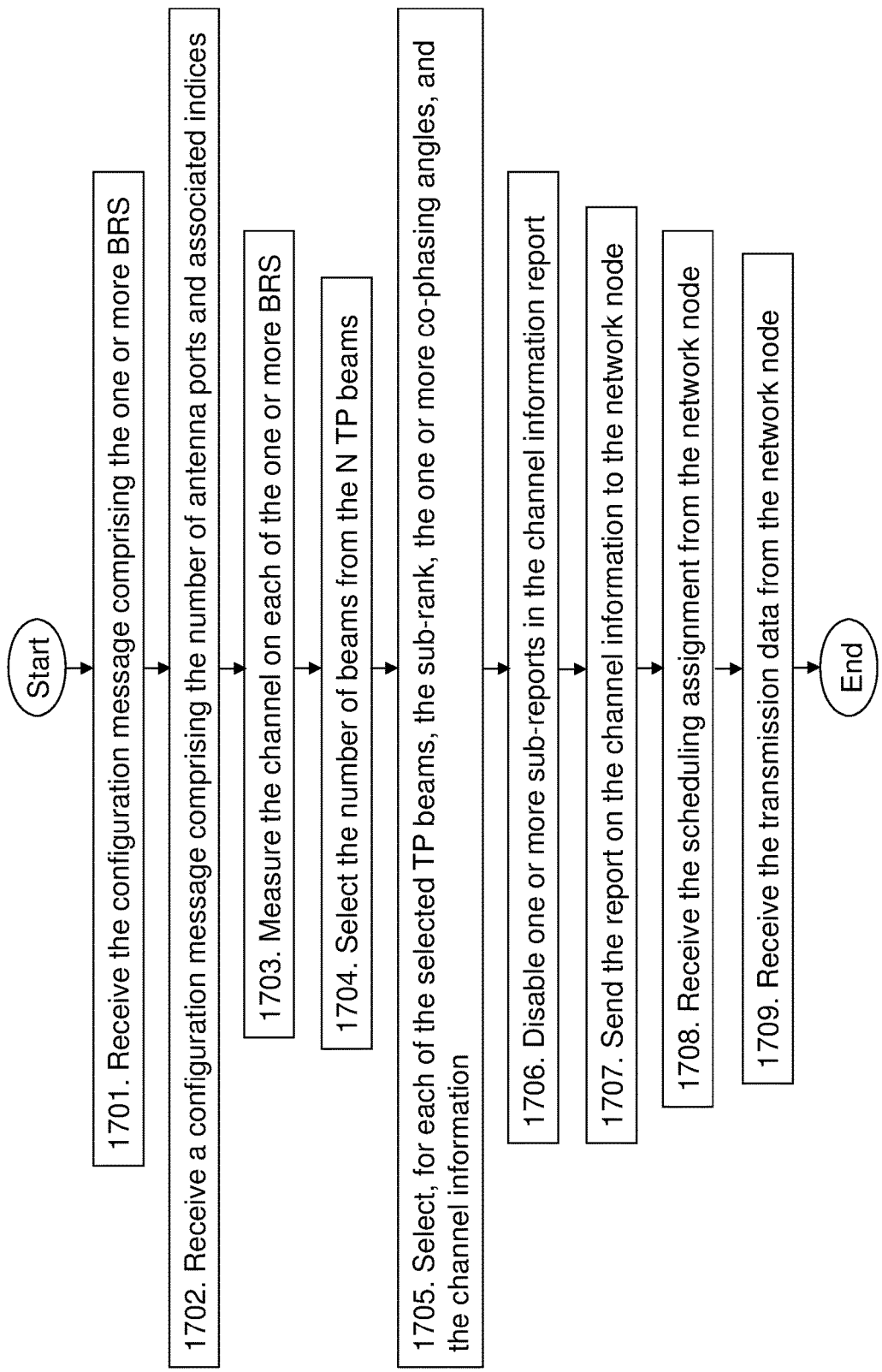
FIG. 17 is a flowchart illustrating embodiments of a method in a wireless device, according to some embodiments.

Embodiments of a method performed by the wireless device 850 for sending a report on channel information to the network node 811, 830, as just described in different embodiments, will now be described with reference to the flowchart depicted depicted in FIG. 17. As stated earlier, the network node 811, 830 controls at least the one TP 811, which at least one TP 811 transmits TP beams. Each of at least a number N of the TP beams is associated with one or more respective BRS, for channel information measurements. In some embodiments, the one or more respective BRS may be beamformed. The wireless device 850 and the network node 811, 830 operate in the wireless communication system 800, as stated earlier. FIG. 17 depicts a flowchart of the actions that are or may be performed by the wireless device 850 in embodiments herein.

As stated earlier, the network node 811, 830 may be one of: the TP 211 and the scheduling network node 830.

In some embodiments, the network node 811, 830 controls at least two TP 811, 812, the at least two TP 811, 812 transmitting the TP beams.

The method may comprise the following actions, which actions may as well be carried out in another suitable order than that described below. In some embodiments, all the actions may be carried out, whereas in other embodiments only some action/s may be carried out.

Action 1701

The wireless device 850 may receive a configuration message from the network node 811, 830, the configuration message comprising the one or more BRS associated with each of the N TP beams. This may be referred to as a first configuration message. This may be implemented, for example, by receiving an RRC message from the network node 811, 830. The selection of the number N by the network node 811, 830 may be based on e.g., uplink measurements. That is, the network may measure an uplink signal in uplink beams that corresponds to the transmission beams used in the downlink. Thus, if the network measures high received energy in an uplink beam, it may be likely that also the same beam used in the downlink has a good connection, a good link, to the UE that transmitted the uplink signal. The number N may thus be determined by the number of receive beams that the network has detected energy above some detection threshold.

Action 1702

The wireless device 850 may receive a configuration message from the network node 811, 830 via higher layer signaling, the configuration message comprising a number of antenna ports to perform channel information measurements on, and associated antenna port indices. This may be referred to as a second configuration message, although it may be the same message as the first message, in some embodiments. This may be implemented by, for example, by receiving an RRC message from the network node 811, 830.

In some embodiments, the higher layer signaling further comprises information about which antenna ports can be combined with the co-phasing term and belong to a same sub-report in the channel information report, and which should not be combined with any other antenna port and belong to a separate sub-report in the channel information report.

Action 1703

The wireless device 850 may measure a channel on each of the one or more BRS associated with each of the N TP beams, wherein each of the one or more BRS associated with each of the N TP beams may be beamformed from the at least one TP 811 using multiple transmit antenna elements at the at least one TP 811, so that the measured channel is not an antenna specific channel, but an effective beamformed channel.

Action 1704

The wireless device 850 may select a number of beams from the N TP beams, based on the measured effective beamformed channel on the one or more BRS associated with each of the N TP beams.

For example, in some embodiments, the wireless device 850 may select the number of beams from the N TP beams based on a selection criteria, for instance, selecting the TP beams with largest received power, above some threshold, or the TP beams that give the largest spectral efficiency.

Action 1705

The wireless device 850 may select, for each of the selected TP beams, a sub-rank, one or more co-phasing angles, and channel information, wherein the sub-rank is a number of simultaneous polarization beams the wireless device 850 may support within the beam. To perform this in the wireless device 850, the wireless device 850 may have to analyse a number of transmission hypotheses, and compute the associated metric for each hypothesis. A metric could for instance be the number of received bits, if this transmission hypothesis is used. For example, the wireless device 850 may compute the metric for all possible single beam transmissions with single sub-rank. Then it may compute all possible single beam transmissions with sub-rank two, taking into account the interference from one layer to the other. Then, all possible combinations of two beam transmissions with sub-ranks one or two per beam, respectively taking into account the interference between beams and between layers of the beams. When the total rank increases, the number of parallel data streams increases, but the interference gets more severe. For all these hypotheses, the metric may be computed, and then the wireless device 850 may select TP beams, sub-rank for each selected TP beam, and the co-phasing angles. In other words, the wireless device 850 may select the hypotheses which gave the largest metric value.

The measurement information collected by the wireless device in action 1703, the selection performed by the wireless device in action 1704 and the information selected by the wireless device in action 1705 may be comprised in the report on the channel information that will be sent to the network node 811, 830. The report on the channel information comprises a number of sub-reports, wherein each sub-report is associated with: a) one respective TP beam of the N TP beams, which is an associated TP beam, wherein each one associated TP beam comprises at least one BRS of the one or more BRS associated with each of the N TP beams, wherein each one associated TP beam is selected by the wireless device 850, as described in action 1704, and b) at least one indicator of channel quality value, wherein the indicator of channel quality value is for one code word transmitted by the network node 811, 830 on the associated TP beam. In the embodiments in which the network node 830 is the scheduling network node 830, being physically located in a dedicated scheduling node, as depicted in FIG. 8, "transmitted by the network node 811, 830" as understood herein will comprise instructing a TP controlled by the network node 830, such as the first transmission point 811, to transmit the TP beams.

As stated earlier, in some embodiments, each of the selected number of beams in action 1704 corresponds, respectively, to each associated TP beam in each sub-report.

Hence, in some embodiments, the channel information is based on the number of beams selected by the wireless device 850 from the N TP beams, based on the one or more BRS associated with each of the N TP beams, as described in action 1704.

In some embodiments, at least a first associated TP beam is associated with two beamformed BRS of the one or more BRS associated with each of the N TP beams, for channel information measurements, each of the two BRS corresponding to one of two polarized beams comprised in the first associated TP beam. In some embodiments, this will apply to all associated TP beams, i.e., all the associated TP beams will be associated in turn with two beamformed BRS, corresponding each to one of two polarized beams comprised in each of the associated TP beams.

In some embodiments, a sub-report associated with the first associated TP beam comprises only the one indicator of channel quality value, and further comprises co-phasing information of the two polarized beams, the co-phasing information being selected by the wireless device 850 to indicate a preferred co-phasing of two antenna ports corresponding to the two beamformed BRSs comprised in the sub-report.

In some embodiments, the report on channel information is a CSI report.

In some embodiments, the indicator of channel quality is a CQI value.

In some embodiments, at least the first sub-report associated with the first associated TP beam further comprises a BRS indicator, the BRS indicator identifying one or two BRS, or one or two antenna ports, associated with the first associated TP beam in the first sub-report. Each of these two BRS, or each of these two antenna ports may correspond to one of the two polarized beams that may be comprised in the first associated TP beam. In some embodiments, this will apply to all the sub-reports.

In some embodiments, the first sub-report associated with the first associated TP beam further comprises a sub-rank indicator indicating a number of BRS in the first associated TP beam, that is e.g., a value of 1 or 2 per TP beam. As just described, each of these two BRS, or each of these two antenna ports may correspond to one of the two polarized beams that may be comprised in the first associated TP beam.

In some embodiments, the wireless device 850 is configured by the network node 811, 830 via a Radio Resource Control, RRC, message, with a value of 1 or 2 BRS antenna ports per TP beam.

In some embodiments, each of the two BRS defines an antenna port in the at least one TP 811 that is associated with one of two different antenna element polarizations.

In some embodiments, a number of antenna ports is independently selected by the wireless device 850 for every sub-report.

In some embodiments, one antenna port of a number of antenna ports selected by the wireless device 850 is selected for one transmit antenna polarization and another antenna port of the number of antenna ports selected by the wireless device 850 is selected for a different transmit antenna polarization and the antenna port and the another antenna port are co-phased together with the co-phasing angle, as described above, in e.g., action 1705.

In some embodiments, antenna port selection within each sub-report is wideband, and multiple co-phasing information values are reported in every sub-report, one per sub-band.

In some embodiments, the indicator of channel quality value is computed by the wireless device 850 by taking into account interference by selected beams associated with other code words in a same sub-report and associated with other code words in other sub-reports within a same report.

In some embodiments, the channel information report has a variable size depending on a number of sub-reports comprised in the channel information report.

In some embodiments, the channel information report has a fixed size independent on a number of sub-reports comprised in the channel information report.

Action 1706

The wireless device 850 may disable one or more sub-reports in the channel information report. In some embodiments, this may be implemented by making a sub-report invalid, by selecting an unused code point or special state in the CQI table.

In some embodiments, the disabled one or more sub-reports are those wherein sub-report payload bits have a value of zero.

Action 1707

The wireless device 850 sending the report on the channel information to the network node 811, 830.

In some embodiments, a maximum number of sub-reports in the report is a capability of the wireless device 850 signaled from the wireless device 850 to the network node 811, 830 using higher layer signalling. For example, in some embodiments, this may be implemented by the wireless device 850 sending a capability of the wireless device 850, using an RRC message to the network node 811, 830.

Action 1708

The wireless device 850 may receive from the network node 811, 830, a scheduling assignment, the scheduling assignment being based on the sent report on the channel information. That is, the network node 811, 830 may encode a code word for each sub-report with non-zero payload in the channel information report, and may indicate the scheduling decision to the wireless device 850. This action may be implemented by, for example, by receiving a scheduling message from the network node 811, 830 using a downlink control channel.

Action 1709

The wireless device 850 may receive from the network node 811, 830, transmission data based on the received scheduling assignment. This may be implemented by, for example, by receiving a shared data channel from the network node 811, 830.

Figure 18:
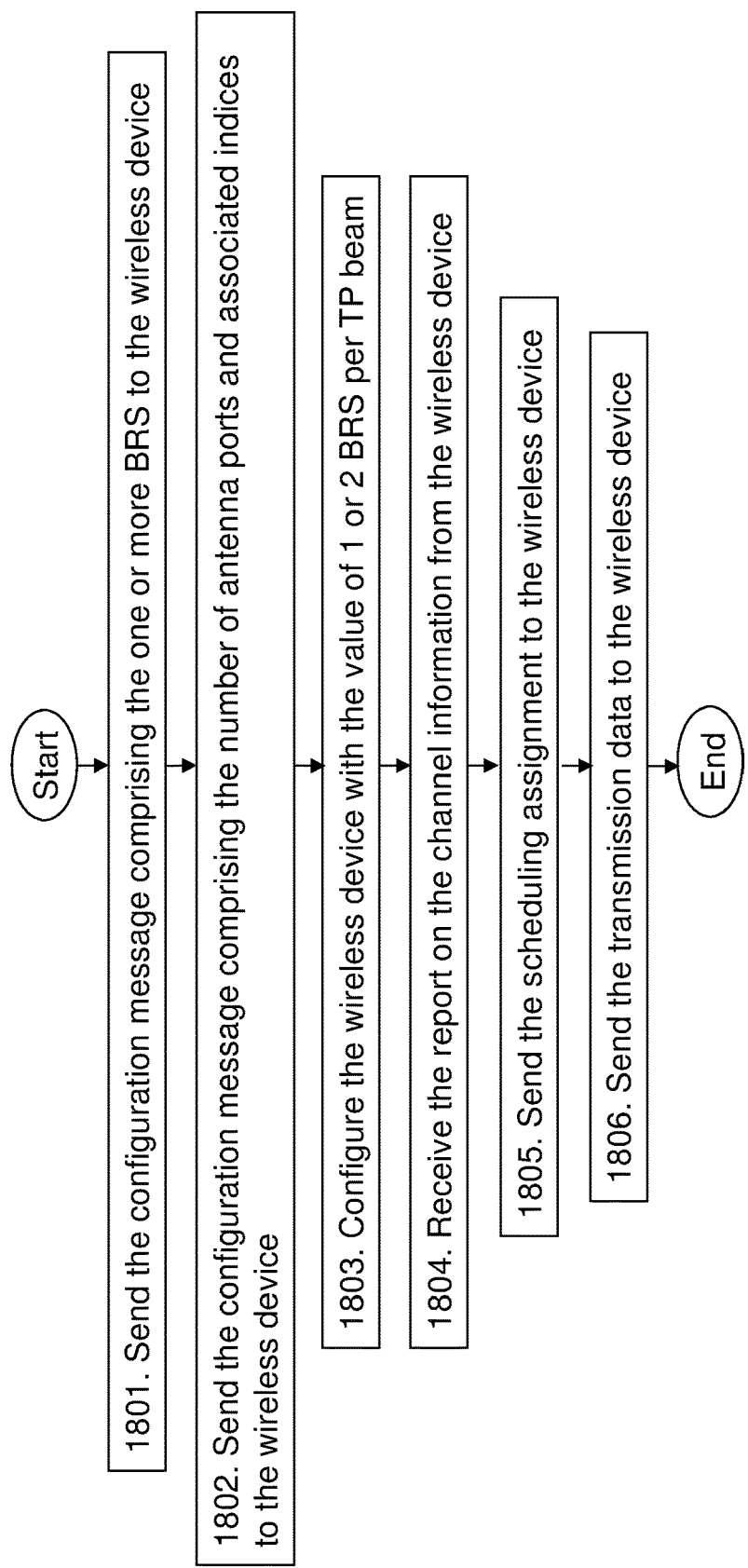
FIG. 18 is a flowchart illustrating embodiments of a method in a network node, according to some embodiments.

Embodiments of a method performed by the network node 811, 830 for receiving a report on channel information from a wireless device 850, as just described in different embodiments, will now be described with reference to the flowchart depicted depicted in FIG. 18. As stated earlier, the network node 811, 830 controls at least the one TP 811, which at least one TP 811 transmits TP beams. Each of at least a number N of the TP beams is associated with one or more respective BRS, for channel information measurements. In some embodiments, the one or more respective BRS may be beamformed. The wireless device 850 and the network node 811, 830 operate in the wireless communication system 800, as stated earlier. FIG. 18 depicts a flowchart of the actions that are or may be performed by the network node 811, 830 in embodiments herein.

As stated earlier, the network node 811, 830 may be one of: the TP 211 and the scheduling network node 830.

In some embodiments, the network node 811, 830 controls at least two TP 811, 812, the at least two TP 811, 812 transmitting the TP beams.

The method may comprise the following actions, which actions may as well be carried out in another suitable order than that described below. In some embodiments, all the actions may be carried out, whereas in other embodiments only some action/s may be carried out.

Action 1801

The network node 811, 830 may send the first configuration message to the wireless device 850, the first configuration message comprising the one or more BRS associated with each of the N TP beams. This may be implemented by, for example, by sending the RRC message to the wireless device 850. A selection criteria; for instance; selecting the TP beams with largest received power, above some threshold, or the TP beams that gives the largest spectral efficiency may be used by the network node 811, 830 to decide on N.

Action 1802

The network node 811, 830 may send the second configuration message to the wireless device 850 via higher layer signaling, the second configuration message comprising the number of antenna ports to perform channel information measurements on, and the associated antenna port indices. This may be implemented by, for example, by receiving the RRC message from the network node 811, 830.

In some embodiments, the higher layer signaling further comprises the information about which antenna ports can be combined with the co-phasing term and belong to the same sub-report in the channel information report, and which should not be combined with any other antenna port and belong to the separate sub-report in the channel information report.

Action 1803

The network node 811, 830 may configure the wireless device 850 via the Radio Resource Control, RRC, message, with the value of 1 or 2 BRS per TP beam. That is, the network node 811, 830 may send a configuration message to the wireless device 850 with the value of 1 or 2 BRS per TP beam.

In some embodiments, each of the two BRS defines the antenna port in the at least one TP 811 that is associated with the one of two different antenna element polarizations.

In some embodiments, actions 1801, 1802 and 1803 may be combined into a single action.

Action 1804

The network node 811, 830 receiving the report on the channel from the wireless device 850. The report on the channel information comprises the number of sub-reports, wherein each sub-report is associated with: a) the one respective TP beam of the N TP beams, which is an associated TP beam, wherein each one associated TP beam comprises at least the one BRS of the one or more BRS associated with each of the N TP beams, wherein each one associated TP beam has been selected by the wireless device 850, as described in action 1704, and b) the at least one indicator of channel quality value, wherein the indicator of channel quality value is for the one code word transmitted by the network node 811, 830 on the associated TP beam. As stated earlier, in the embodiments in which the network node 830 is the scheduling network node 830, being physically located in a dedicated scheduling node, as depicted in FIG. 8, "transmitted by the network node 811, 830" as understood herein will comprise instructing a TP controlled by the network node 830, such as the first transmission point 811, to transmit the TP beams.

As described earlier, in some embodiments, the wireless device 850 may have selected the number of beams from the N TP beams, based on the measured effective beamformed channel on the one or more BRS associated with each of the N TP beams.

Also as described earlier, in some embodiments, the wireless device 850 may have selected, for each of the selected TP beams, the sub-rank, the one or more co-phasing angles, and the channel information, wherein the sub-rank is the number of simultaneous polarization beams the wireless device 850 can support.

Thus, in some embodiments, each of the selected number of beams in action 1704 corresponds, respectively, to each associated TP beam in each sub-report.

Hence, in some embodiments, the channel information is based on the number of beams selected by the wireless device 850 from the N TP beams, based on the one or more BRS associated with each of the N TP beams, as described in action 1704.

In some embodiments, at least the first associated TP beam is associated with the two beamformed BRSs of the one or more BRSs associated with each of the N TP beams, for channel information measurements, each of the two BRS corresponding to one of two polarized beams comprised in the first associated TP beam. In some embodiments, this will apply to all associated TP beams, i.e., all the associated TP beams will be associated in turn with two beamformed BRS, corresponding each to one of two polarized beams comprised in each of the associated TP beams.

In some of embodiments, the sub-report associated with the first associated TP beam comprises only the one indicator of channel quality value, and further comprises the co-phasing information of the two polarized beams, the co-phasing information having been selected by the wireless device 850 to indicate a preferred co-phasing of two antenna ports corresponding to the two beamformed BRSs comprised in the sub-report.

In some embodiments, the report on channel information is a CSI report.

In some embodiments, the indicator of channel quality is a CQI value.

In some embodiments, at least the first sub-report associated with the first associated TP beam further comprises the BRS indicator, the BRS indicator identifying the one or two BRS, or the one or two antenna ports, associated with the first associated TP beam in the first sub-report. Each of these two BRS, or each of these two antenna ports may correspond to one of the two polarized beams that may be comprised in the first associated TP beam. In some embodiments, this will apply to all the sub-reports.

In some embodiments, the first sub-report associated with the first associated TP beam further comprises the sub-rank indicator indicating a number of BRS in the first associated TP beam, that is e.g., a value of 1 or 2 per TP beam. As described, each of these two BRS, or each of these two antenna ports may correspond to one of the two polarized beams that may be comprised in the first associated TP beam.

In some embodiments, each of the two BRS defines an antenna port in the at least one TP 811 that is associated with the one of two different antenna element polarizations.

In some embodiments, the number of antenna ports is independently selected by the wireless device 850 for every sub-report.

In some embodiments, the maximum number of sub-reports in the report is the capability of the wireless device 850 signaled from the wireless device 850 to the network node 811, 830 using higher layer signalling. For example, in some embodiments, this may be implemented by the wireless device 850 sending a capability of the wireless device 850 using an RRC message to the network node 811, 830.

In some embodiments, one antenna port of the number of antenna ports selected by the wireless device 850 has been selected by the wireless device 850 for one transmit antenna polarization and another antenna port of the number of antenna ports selected by the wireless device 850 has been selected by the wireless device 850 for a different transmit antenna polarization and the antenna port and the another antenna port are co-phased together with a co-phasing angle, as described above, in e.g., action 1705.

In some embodiments, antenna port selection within each sub-report is wideband, and multiple co-phasing information values are reported in every sub-report, one per sub-band.

In some embodiments, the indicator of channel quality value has been computed by the wireless device 850 by taking into account the interference by selected beams associated with other code words in the same sub-report and associated with other code words in other sub-reports within the same report.

In some embodiments, the channel information report has a variable size depending on a number of sub-reports comprised in the channel information report.

In some embodiments, the channel information report has a fixed size independent on a number of sub-reports comprised in the channel information report.

Action 1805

The network node 811, 830 may send to the wireless device 850, the scheduling assignment, the scheduling assignment being based on the received report on the channel information. This action may be implemented by, for example, by sending the scheduling message in the downlink control channel message to the wireless device 850.

Action 1806

The network node 811, 830 may send to the wireless device 850, transmission data based on the received scheduling assignment. This may be implemented by, for example, by sending the shared data channel message to the wireless device 850.

This feedback framework described herein, e.g., the CSI feedback framework, has large benefits over the LTE framework when for example, operating in an environment with high LOS probability, and it allows for multiple transmission points being used in parallel to transmit different code words to the wireless device 850.

To perform the method actions described above the wireless device 850 is configured to send the report on channel information to the network node 811, 830. The wireless device 850 comprises the following arrangement depicted in FIG. 19. The network node 811, 830 is configured to control to control at least the one Transmission Point, TP, 811, which at least one TP 811 is configured to transmit TP beams, wherein each of at least a number N of the TP beams is associated with one or more respective BRS for channel information measurements. In some embodiments, the one or more respective BRS may be beamformed. The wireless device 850 and the network node 811, 830 are configured to operate in the wireless communications network 800. The detailed description of some of the following corresponds to the same references provided above, in relation to the actions described for the wireless device 850, and will thus not be repeated here.

In some embodiments, the network node 811, 830 is one of: the TP 211 and the scheduling network node 830.

In some embodiments, the network node 811, 830 is configured to control at least two TP 811, 812, the at least two TP 811, 812 are configured to transmit the TP beams.

The wireless device 850 may be configured to send the report on the channel information to the network node 811, 830, the report on the channel information comprising the number of sub-reports, wherein each sub-report is associated with: a) one respective TP beam of the N TP beams, which is an associated TP beam, wherein each one associated TP beam comprises the at least one BRS of the one or more BRS associated with each of the N TP beams, wherein each one associated TP beam has been selected by the wireless device 850, and b) at least one indicator of channel quality value, wherein the indicator of channel quality value is for one code word configured to be transmitted by the network node 811, 830 on the associated TP beam.

In some embodiments, this may be performed by a sending module 1901 comprised in the wireless device 850.

In some embodiments, at least the first associated TP beam is associated with two beamformed BRS of the one or more BRS associated with each of the N TP beams, for channel information measurements, each of the two BRS corresponding to the one of two polarized beams comprised in the first associated TP beam.

In some embodiments, the sub-report associated with the first associated TP beam comprises the one indicator of channel quality value, and further comprises the co-phasing information of the two polarized beams, the co-phasing information having been selected by the wireless device 850 to indicate a preferred co-phasing of two antenna ports corresponding to the two beamformed BRS comprised in the sub-report.

In some embodiments, the channel information is based on the number of beams selected by the wireless device 850 from the N TP beams, based on the one or more BRS associated with each of the N TP beams.

In some embodiments, the report on channel information is a Channel State Information, CSI, report.

In some embodiments, the indicator of channel quality is a Channel Quality Indicator, CQI, value.

In some embodiments, the first sub-report associated with the first associated TP beam further comprises the BRS indicator, the BRS indicator identifying the one or two BRS, or the one or two antenna ports, associated with the first associated TP beam in the first sub-report.

In some embodiments, the first sub-report associated with the first associated TP beam further comprises the sub-rank indicator indicating the number of BRS in the first associated TP beam.

In some embodiments, the wireless device 850 is configured by the network node 811, 830 via a Radio Resource Control (RRC) message, with a value of 1 or 2 BRS per TP beam.

In some embodiments, each of the two BRS defines the antenna port in the at least one TP 811 that is associated with the one of two different antenna element polarizations.

In some embodiments, the number of antenna ports is configured to be independently selected by the wireless device 850 for every sub-report.

In some embodiments, the maximum number of sub-reports in the report is the capability of the wireless device 850 configured to be signaled from the wireless device 850 to the network node 811, 830 using higher layer signalling.

In some embodiments, one antenna port of the number of antenna ports selected by the wireless device 850 is configured to be selected for the one transmit antenna polarization and another antenna port of the number of antenna ports selected by the wireless device 850 is configured to be selected for the different transmit antenna polarization and the antenna port and the another antenna port are co-phased together with the co-phasing angle.

In some embodiments, the antenna port selection within each sub-report is wideband, and multiple co-phasing information values are reported in every sub-report, one per sub-band.

In some embodiments, the indicator of channel quality value is configured to be computed by taking into account the interference by selected beams associated with other code words in the same sub-report and associated with other code words in other sub-reports within the same report.

In some embodiments, the channel information report has a variable size depending on the number of sub-reports comprised in the channel information report.

In some embodiments, the channel information report has a fixed size independent on a number of sub-reports comprised in the channel information report.

In some embodiments, the wireless device 850 is further configured to disable the one or more sub-reports in the channel information report In some embodiments, the disabled one more sub-reports may be those wherein sub-report payload bits have a value of zero This may be performed by a disabling module 1902 comprised in the wireless device 850.

In some embodiments, the wireless device 850 is further configured to receive the second configuration message from the network node 811, 830 via higher layer signaling, the second configuration message comprising the number of antenna ports to perform channel information measurements on, and the associated antenna port indices.

This may be performed by a receiving module 1903 comprised in the wireless device 850.

In some embodiments, the higher layer signaling further comprises information about which antenna ports can be combined with the co-phasing term and belong to the same sub-report in the channel information report, and which should not be combined with any other antenna port and belong to the separate sub-report in the channel information report.

In some embodiments, the wireless device 850 may be configured to receive the first configuration message from the network node 811, 830, the first configuration message comprising the one or more BRS associated with each of the N TP beams This may also be performed by the receiving module 1903.

In some embodiments, the wireless device 850 may be configured to receive, from the network node 811, 830, the scheduling assignment, the scheduling assignment being based on the sent report on the channel information.

This may also be performed by the receiving module 1903.

In some embodiments, the wireless device 850 may be configured to receive, from the network node 811, 830, the transmission data based on the received scheduling assignment.

This may also be performed by the receiving module 1903.

In some embodiments, the wireless device 850 may be configured to measure the channel on each of the one or more BRS associated with each of the N TP beams, wherein each of the one or more BRS associated with each of the N TP beams may be beamformed from the at least one TP 811 using multiple transmit antenna elements at the at least one TP 811, so that the measured channel is not an antenna specific channel but, an effective beamformed channel.

This may be performed by a measuring module 1904 comprised in the wireless device 850.

In some embodiments, the wireless device 850 may be configured to select the number of beams from the N TP beams, based on the measured effective beamformed channel on the one or more BRS associated with each of the N TP beams, wherein each of the selected number of beams correspond, respectively, to the each associated TP beam in each sub-report.

This may be performed by a selecting module 1905 comprised in the wireless device 850.

In some embodiments, the wireless device 850 may be configured to select for each of the selected TP beams, the sub-rank, the one or more co-phasing angles, and the channel information, wherein the sub-rank is the number of simultaneous polarization beams the wireless device 850 can support.

This may be also performed by the measuring module 1904 comprised in the wireless device 850.

Figure 19:
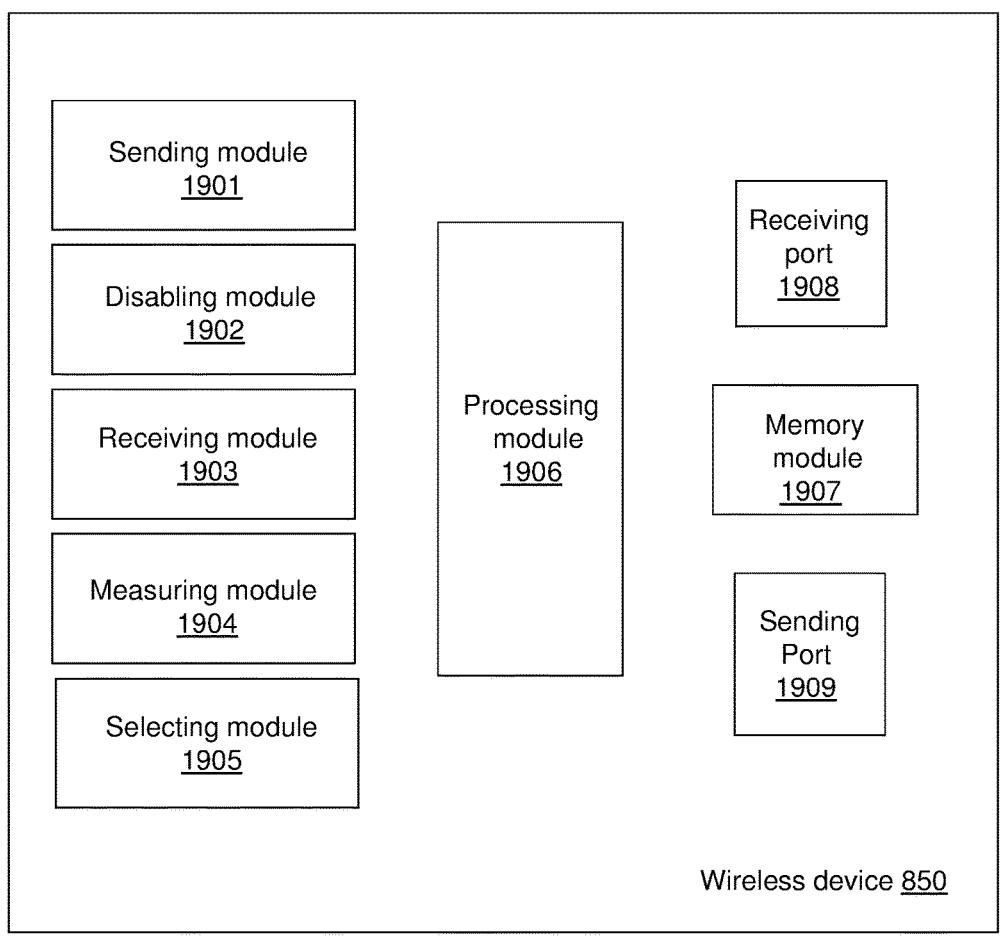
FIG. 19 is a block diagram of a wireless device according to some embodiments.

The embodiments herein for send the report on channel information to the network node 811, 830 may be implemented through one or more processors, such as the processing module 1906 in the wireless device 850 depicted in FIG. 19, together with computer program code for performing the functions and actions of the embodiments herein. The program code mentioned above may also be provided as a computer program product, for instance in the form of a data carrier carrying computer program code for performing the embodiments herein when being loaded into the in the wireless device 850. One such carrier may be in the form of a CD ROM disc. It may be however feasible with other data carriers such as a memory stick. The computer program code may furthermore be provided as pure program code on a server and downloaded to the wireless device 850.

The wireless device 850 may further comprise a memory module 1907 comprising one or more memory units. The memory module 1907 may be arranged to be used to store data in relation to applications to perform the methods herein when being executed in the wireless device 850. Memory module 1907 may be in communication with the processing module 1906. Any of the other information processed by the processing module 1906 may also be stored in the memory module 1907.

In some embodiments, information may be received from, e.g., the network node 811, 830, through a receiving port 1909. In some embodiments, the receiving port 1909 may be, for example, connected to the one or more antennas in the wireless device 850. In other embodiments, the wireless device 850 may receive information from another structure in the wireless communications network 800 through the receiving port 1909. Since the receiving port 1909 may be in communication with the processing module 1906, the receiving port 1909 may then send the received information to the processing module 1906. The receiving port 1909 may also be configured to receive other information.

The information processed by the processing module 1906 in relation to the embodiments of method herein may be stored in the memory module 1907 which, as stated earlier, may be in communication with the processing module 1906 and the receiving port 1909.

The processing module 1906 may be further configured to transmit or send information to e.g., the network node 811, 830, through a sending port 1909, which may be in communication with the processing module 1906, and the memory module 1907.

Those skilled in the art will also appreciate that the different modules 1901-1905 described above may refer to a combination of analog and digital modules, and/or one or more processors configured with software and/or firmware, e.g., stored in memory, that, when executed by the one or more processors such as the processing module 1906, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, the methods according to the embodiments described herein for the wireless device 850 are respectively implemented by means of a computer program product, comprising instructions, i.e., software code portions, which, when executed on at least one processor, cause the at least one processor to carry out the actions described herein, as performed by the wireless device 850. The computer program product may be stored on a computer-readable storage medium. The computer-readable storage medium, having stored thereon the computer program, may comprise instructions which, when executed on at least one processor, cause the at least one processor to carry out the actions described herein, as performed by the wireless device 850. In some embodiments, the computer-readable storage medium may be a non-transitory computer-readable storage medium.

To perform the method actions described earlier the network node 811, 830 is configured to receive the report on channel information from the wireless device 850. The network node 811, 830 comprises the following arrangement depicted in FIG. 20. The network node 811, 830 is configured to control at least the one Transmission Point, TP, 811, which at least one TP 811 is configured to transmit TP beams, wherein each of at least a number N of the TP beams is associated with one or more respective BRS for channel information measurements. In some embodiments, the one or more respective BRS may be beamformed. The wireless device 850 and the network node 811, 830 are configured to operate in the wireless communications network 800. The detailed description of some of the following corresponds to the same references provided above, in relation to the actions described for the network node 811, 830, and will thus not be repeated here.

In some embodiments, the network node 811, 830 is one of: the TP 211 and the scheduling network node 830.

In some embodiments, the network node 811, 830 is configured to control at least two TP 811, 812, the at least two TP 811, 812 are configured to transmit the TP beams.

The network node 811, 830 may be configured to receive the report on the channel information to the network node 811, 830, the report on the channel information comprising the number of sub-reports, wherein each sub-report is associated with: a) the one respective TP beam of the N TP beams, which is an associated TP beam, wherein each one associated TP beam comprises the at least one BRS of the one or more BRS associated with each of the N TP beams, wherein each one associated TP beam has been selected by the wireless device 850, and b) at the least one indicator of channel quality value, wherein the indicator of channel quality value is for one code word configured to be transmitted by the network node 811, 830 on the associated TP beam.

In some embodiments, this may be performed by a receiving module 2001 comprised in the wireless device 850.

In some embodiments, at least the first associated TP beam is associated with two beamformed BRS of the one or more BRS associated with each of the N TP beams, for channel information measurements, each of the two BRS corresponding to the one of two polarized beams comprised in the first associated TP beam.

In some embodiments, the sub-report associated with the first associated TP beam comprises the one indicator of channel quality value, and further comprises the co-phasing information of the two polarized beams, the co-phasing information having been selected by the wireless device 850 to indicate a preferred co-phasing of two antenna ports corresponding to the two beamformed BRS comprised in the sub-report.

In some embodiments, the channel information is based on the number of beams selected by the wireless device 850 from the N TP beams, based on the one or more BRS associated with each of the N TP beams.

In some embodiments, the report on channel information is a Channel State Information, CSI, report.

In some embodiments, the indicator of channel quality is a Channel Quality Indicator, CQI, value.

In some embodiments, the first sub-report associated with the first associated TP beam further comprises the BRS indicator, the BRS indicator identifying the one or two BRS, or the one or two antenna ports, associated with the first associated TP beam in the first sub-report.

In some embodiments, the first sub-report associated with the first associated TP beam further comprises the sub-rank indicator indicating the number of BRS in the first associated TP beam.

In some embodiments, each of the two BRS defines the antenna port in the at least one TP 811 that is associated with the one of two different antenna element polarizations.

In some embodiments, the number of antenna ports has been independently selected by the wireless device 850 for every sub-report.

In some embodiments, the maximum number of sub-reports in the report is the capability of the wireless device 850 configured to be signaled from the wireless device 850 to the network node 811, 830 using higher layer signalling.

In some embodiments, one antenna port of a number of antenna ports selected by the wireless device 850 has been selected by the wireless device 850 for one transmit antenna polarization and another antenna port of the number of antenna ports selected by the wireless device 850 has been selected by the wireless device 850 for a different transmit antenna polarization and the antenna port and the another antenna port are co-phased together with a co-phasing angle.

In some embodiments, the antenna port selection within each sub-report is wideband, and multiple co-phasing information values are reported in every sub-report, one per sub-band.

In some embodiments, the indicator of channel quality value is configured to be computed by the wireless device 850 by taking into account the interference by selected beams associated with other code words in the same sub-report and associated with other code words in other sub-reports within the same report.

In some embodiments, the channel information report has a variable size depending on the number of sub-reports comprised in the channel information report.

In some embodiments, the channel information report has a fixed size independent on a number of sub-reports comprised in the channel information report.

In some embodiments, the wireless device 850 has selected a number of beams from the N TP beams, based on the measured effective beamformed channel on the one or more BRS associated with each of the N TP beams, wherein each of the selected number of beams correspond, respectively, to the each associated TP beam in each sub-report.

In some embodiments, the wireless device 850 has selected for each of the selected TP beams, a sub-rank, one or more co-phasing angles, and channel information, wherein the sub-rank is a number of simultaneous polarization beams the wireless device 850 can support.

In some embodiments, the network node 811, 830 is configured to configure the wireless device 850 via the RRC, message, with a value of 1 or 2 BRS per TP beam.

This may be performed by a configuring module 2002 comprised in the wireless device 850.

In some embodiments, the network node 811, 830 is further configured to send a second configuration message to the wireless device 850 via higher layer signaling, the second configuration message comprising a number of antenna ports to perform channel information measurements on, and associated antenna port indices.

This may be performed by a sending module 2003 comprised in the wireless device 850.

In some embodiments, the higher layer signaling further comprises information about which antenna ports can be combined with a co-phasing term and belong to a same sub-report in the channel information report, and which should not be combined with any other antenna port and belong to a separate sub-report in the channel information report.

In some embodiments, the network node 811, 830 is further configured to send the first configuration message to the wireless device 850, the first configuration message comprising the one or more BRS associated with each of the N TP beams.

This may also be performed by the sending module 2003.

In some embodiments, the network node 811, 830 may be configured to send to the wireless device 850, the scheduling assignment, the scheduling assignment being based on the received report on the channel information.

This may also be performed by the sending module 2003.

In some embodiments, the network node 811, 830 may be configured to send to the wireless device 850, the transmission data based on the received scheduling assignment.

This may also be performed by the sending module 2003.

Figure 20:
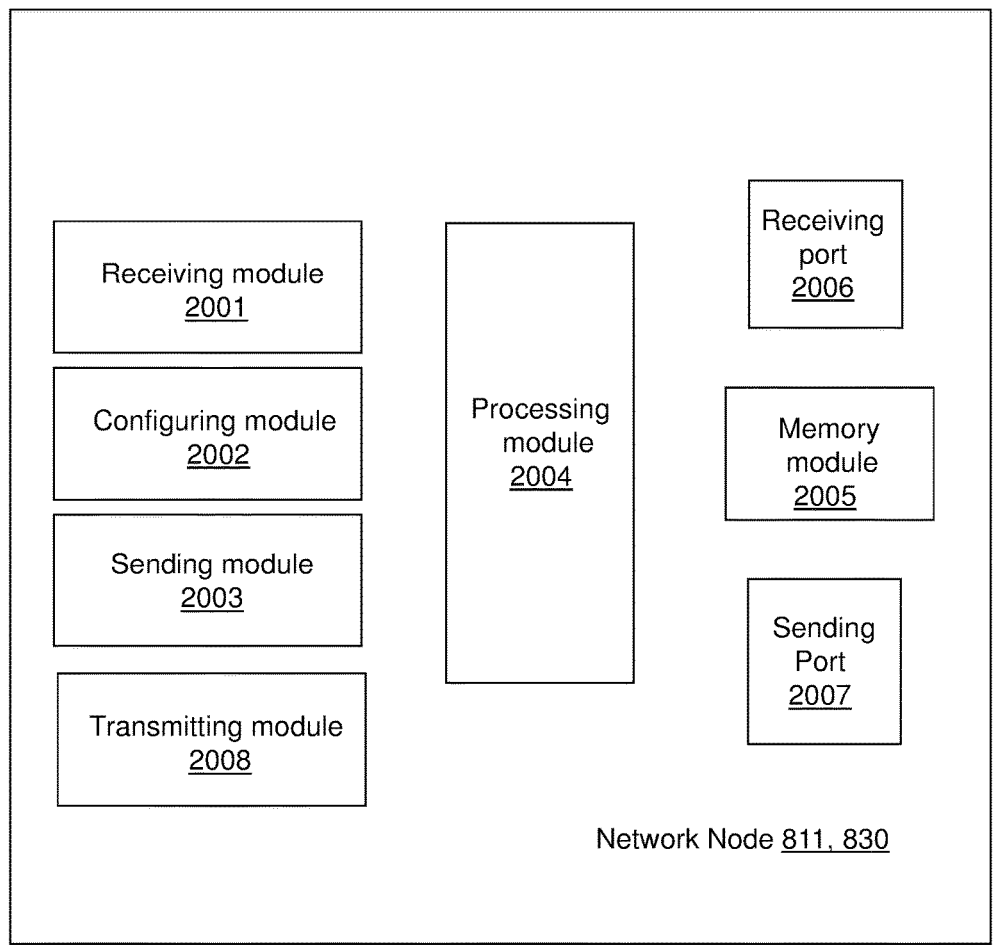
FIG. 20 is a block diagram of a network node according to some embodiments.

The embodiments herein for receiving the report from the wireless device 850 may be implemented through one or more processors, such as the processing module 2004 in the network node 811, 830 depicted in FIG. 20, together with computer program code for performing the functions and actions of the embodiments herein. The program code mentioned above may also be provided as a computer program product, for instance in the form of a data carrier carrying computer program code for performing the embodiments herein when being loaded into the in the network node 811, 830. One such carrier may be in the form of a CD ROM disc. It may be however feasible with other data carriers such as a memory stick. The computer program code may furthermore be provided as pure program code on a server and downloaded to the network node 811, 830.

The network node 811, 830 may further comprise a memory module 2005 comprising one or more memory units. The memory module 2005 may be arranged to be used to store data in relation to applications to perform the methods herein when being executed in the network node 811, 830. Memory module 2005 may be in communication with the processing module 2004. Any of the other information processed by the processing module 2004 may also be stored in the memory module 2005.

In some embodiments, information may be received from, e.g., the wireless device 850, through a receiving port 2006. In some embodiments, the receiving port 2006 may be, for example, connected to the one or more antennas in the network node 811, 830. In other embodiments, the network node 811, 830 may receive information from another structure in the wireless communications network 800 through the receiving port 2006. Since the receiving port 2006 may be in communication with the processing module 2004, the receiving port 2006 may then send the received information to the processing module 2004. The receiving port 2006 may also be configured to receive other information.

The information processed by the processing module 2004 in relation to the embodiments of method herein may be stored in the memory module 2005 which, as stated earlier, may be in communication with the processing module 2004 and the receiving port 2006.

The processing module 2004 may be further configured to transmit or send information to e.g., the network node 811, 830, through a sending port 2007, which may be in communication with the processing module 2004, and the memory module 2005.

Transmission of the TP beams by the TP 811, and transmission of the and the at least one code word by the network node 811, 830 on the associated TP beam may be performed by a transmitting module 2008 comprised in the network node 811, 830.

Those skilled in the art will also appreciate that the different modules 2001-2003, and 2008 described above may refer to a combination of analog and digital modules, and/or one or more processors configured with software and/or firmware, e.g., stored in memory, that, when executed by the one or more processors such as the processing module 2004, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, the methods according to the embodiments described herein for the network node 811, 830 are respectively implemented by means of a computer program product, comprising instructions, i.e., software code portions, which, when executed on at least one processor, cause the at least one processor to carry out the actions described herein, as performed by the network node 811, 830. The computer program product may be stored on a computer-readable storage medium. The computer-readable storage medium, having stored thereon the computer program, may comprise instructions which, when executed on at least one processor, cause the at least one processor to carry out the actions described herein, as performed by the network node 811, 830. In some embodiments, the computer-readable storage medium may be a non-transitory computer-readable storage medium.

When using the word "comprise" or "comprising" it shall be interpreted as non-limiting, i.e. meaning "consist at least of".

The modules described may be for performing any of the pertinent embodiments described.

The embodiments herein are not limited to the above described preferred embodiments. Various alternatives, modifications and equivalents may be used. Therefore, the above embodiments should not be taken as limiting the scope of the invention.

The invention claimed is:

1. A method performed by a wireless device for sending a report on channel information to a network node, the network node controlling at least one Transmission Point, TP, which at least one TP transmits TP beams, wherein each of at least a number N of the TP beams is associated with one or more respective beamformed Beam-specific Reference Signals, BRS, for channel information measurements, the wireless device and the network node operating in a wireless communications system, the method comprising:

sending the report on the channel information to the network node, the report on the channel information comprising a number of sub-reports, wherein each sub-report is associated with:
one respective TP beam of the N TP beams, which is an associated TP beam, wherein each one associated TP beam comprises at least one BRS of the one or more BRS associated with each of the N TP beams, wherein each one associated TP beam is selected by the wireless device, and at least one indicator of channel quality value, wherein the indicator of channel quality value is for one code word transmitted by the network node on the associated TP beam, wherein each sub-report corresponds to one code word and wherein each code word corresponds to only one sub-report;

wherein at least a first associated TP beam is associated with two beamformed BRS of the one or more BRS associated with each of the N TP beams, for channel information measurements, each of the two BRS corresponding to one of two polarized beams comprised in the first associated TP beam.

2. The method of claim 1, wherein a sub-report associated with the first associated TP beam comprises the one indicator of channel quality value, and further comprises co-phasing information of the two polarized beams, the co-phasing information being selected by the wireless device to indicate a preferred co-phasing of two antenna ports corresponding to the two beamformed BRS comprised in the sub-report.

3. The method according to claim 1, wherein the report on channel information is a Channel State Information, CSI, report, and wherein the indicator of channel quality is a Channel Quality Indicator, CQI, value.

4. The method according to of claim 1, wherein a first sub-report associated with the first associated TP beam further comprises a BRS indicator, the BRS indicator identifying one or two BRS, or one or two antenna ports, associated with the first associated TP beam in the first sub-report.

5. The method according to claim 1, wherein the indicator of channel quality value is computed by taking into account an interference by selected beams associated with other code words in a same sub-report and associated with other code words in other sub-reports within a same report.

6. The method according to claim 1, further comprising:
receiving a configuration message from the network node via higher layer signaling, the configuration message comprising a number of antenna ports to perform channel information measurements on, and associated antenna port indices; and/or
receiving, from the network node, a scheduling assignment, the scheduling assignment being based on the sent report on the channel information.

7. The method of claim 1,
wherein the at least one TP transmits first and second TP beams so that the number N of the TP beams is at least two,
wherein the first TP beam is associated with a first BRS and the second TP beam is associated with a second BRS,
wherein the number of sub-reports includes first and second sub-reports,
wherein the at least one indicator of channel quality value includes first and second indicators of channel quality value,
wherein the first sub-report is associated with the first TP beam and the first indicator of channel quality value for a first code word transmitted on the first TP beam,
wherein the second sub-report is associated with the second TP beam and the second indicator of channel quality value for a second code word transmitted on the second TP beam,
wherein the first and second code words are different.

8. A method performed by a network node for receiving a report on channel information from a wireless device, the network node controlling at least one Transmission Point, TP, which at least one TP transmits TP beams, wherein each of at least a number N of the TP beams is associated with one or more respective beamformed Beam-specific Reference Signals, BRS, for channel information measurements, the wireless device and the network node operating in a wireless communications system, the method comprising:
receiving the report on the channel information from the wireless device, the report on the channel information comprising a number of sub-reports, wherein each sub-report is associated with:
one respective TP beam of the N TP beams, which is an associated TP beam, wherein each one associated TP beam comprises at least one BRS of the one or more BRS associated with each of the N TP beams, wherein each one associated TP beam has been selected by the wireless device, and
at least one indicator of channel quality value, wherein the indicator of channel quality value is for one code word transmitted by the network node on the associated TP beam, wherein each sub-report corresponds to one code word and wherein each code word corresponds to only one sub-report;
wherein at least a first associated TP beam is associated with two beamformed BRS of the one or more BRS associated with each of the N TP beams, for channel information measurements, each of the two BRS corresponding to one of two polarized beams comprised in the first associated TP beam.

9. The method of claim 8, wherein a sub-report associated with the first associated TP beam comprises the one indicator of channel quality value, and further comprises co-phasing information of the two polarized beams, the co-phasing information having been selected by the wireless device to indicate a preferred co-phasing of two antenna ports corresponding to the two beamformed BRS comprised in the sub-report.

10. The method according to claim 8, wherein the report on channel information is a Channel State Information, CSI, report, and wherein the indicator of channel quality is a Channel Quality Indicator, CQI, value.

11. The method according to claim 8, wherein a first sub-report associated with the first associated TP beam further comprises a BRS indicator, the BRS indicator identifying one or two BRS, or one or two antenna ports, associated with the first associated TP beam in the first sub-report.

12. The method according to claim 8, wherein the indicator of channel quality value has been computed by the wireless device by taking into account interference by selected beams associated with other code words in a same sub-report and associated with other code words in other sub-reports within a same report.

13. The method according to claim 8, further comprising:
sending a configuration message to the wireless device via higher layer signaling, the configuration message comprising a number of antenna ports to perform channel information measurements on, and associated antenna port indices; and/or
sending, to the wireless device, a scheduling assignment, the scheduling assignment being based on the received report on the channel information.

14. The method of claim 8,
wherein the at least one TP transmits first and second TP beams so that the number N of the TP beams is at least two,
wherein the first TP beam is associated with a first BRS and the second TP beam is associated with a second BRS,
wherein the number of sub-reports includes first and second sub-reports,
wherein the at least one indicator of channel quality value includes first and second indicators of channel quality value,
wherein the first sub-report is associated with the first TP beam and the first indicator of channel quality value for a first code word transmitted on the first TP beam,
wherein the second sub-report is associated with the second TP beam and the second indicator of channel quality value for a second code word transmitted on the second TP beam,
wherein the first and second code words are different.

15. A wireless device configured to send a report on channel information to a network node, the network node being configured to control at least one Transmission Point, TP, which at least one TP is configured to transmit TP beams, wherein each of at least a number N of the TP beams is associated with one or more respective beamformed Beam-specific Reference Signals, BRS, for channel information measurements, the wireless device and the network node being configured to operate in a wireless communications system, the wireless device being further configured to:
send the report on the channel information to the network node, the report on the channel information comprising a number of sub-reports, wherein each sub-report is associated with:
one respective TP beam of the N TP beams, which is an associated TP beam, wherein each one associated TP beam comprises at least one BRS of the one or more BRS associated with each of the N TP beams, wherein each one associated TP beam is configured to have been selected by the wireless device, and
at least one indicator of channel quality value, wherein the indicator of channel quality value is for one code word configured to be transmitted by the network node on the associated TP beam, wherein each sub-report corresponds to one code word and wherein each code word corresponds to only one sub-report;
wherein at least a first associated TP beam is associated with two beamformed BRS of the one or more BRS associated with each of the N TP beams, for channel information measurements, each of the two BRS corresponding to one of two polarized beams comprised in the first associated TP beam.

16. The wireless device of claim 15, wherein a sub-report associated with the first associated TP beam comprises the one indicator of channel quality value, and further comprises co-phasing information of the two polarized beams, the co-phasing information having been selected by the wireless device to indicate a preferred co-phasing of two antenna ports corresponding to the two beamformed BRS comprised in the sub-report.

17. The wireless device according to claim 15, wherein the report on channel information is a Channel State Information, CSI, report, and wherein the indicator of channel quality is a Channel Quality Indicator, CQI, value.

18. The wireless device according to claim 15, wherein a first sub-report associated with the first associated TP beam further comprises a BRS indicator, the BRS indicator identifying one or two BRS, or one or two antenna ports, associated with the first associated TP beam in the first sub-report.

19. The wireless device according to claim 15, wherein the indicator of channel quality value is configured to be computed by taking into account an interference by selected beams associated with other code words in a same sub-report and associated with other code words in other sub-reports within a same report.

20. The method of claim 15,
wherein the at least one TP transmits first and second TP beams so that the number N of the TP beams is at least two,
wherein the first TP beam is associated with a first BRS and the second TP beam is associated with a second BRS,
wherein the number of sub-reports includes first and second sub-reports,
wherein the at least one indicator of channel quality value includes first and second indicators of channel quality value,
wherein the first sub-report is associated with the first TP beam and the first indicator of channel quality value for a first code word transmitted on the first TP beam,
wherein the second sub-report is associated with the second TP beam and the second indicator of channel quality value for a second code word transmitted on the second TP beam,
wherein the first and second code words are different.

21. A network node configured to receive a report on channel information from a wireless device, the network node controlling at least one Transmission Point, TP, which at least one TP transmits TP beams, wherein each of at least a number N of the TP beams is associated with one or more respective beamformed Beam-specific Reference Signals, BRS, for channel information measurements, the wireless device and the network node being configured to operate in a wireless communications system, the network node being configured to:
receive the report on the channel information from the wireless device, the report on the channel information comprising a number of sub-reports, wherein each sub-report is associated with:
one respective TP beam of the N TP beams, which is an associated TP beam, wherein each one associated TP beam comprises at least one BRS of the one or more BRS associated with each of the N TP beams, wherein each one associated TP beam has been selected by the wireless device, and
at least one indicator of channel quality value, wherein the indicator of channel quality value is for one code word configured to be transmitted by the network node on the associated TP beam, wherein each sub-report corresponds to one code word and wherein each code word corresponds to only one sub-report;
wherein at least a first associated TP beam is associated with two beamformed BRS of the one or more BRS associated with each of the N TP beams, for channel information measurements, each of the two BRS corresponding to one of two polarized beams comprised in the first associated TP beam.

22. The network node of claim 21, wherein a sub-report associated with the first associated TP beam comprises the one indicator of channel quality value, and further comprises co-phasing information of the two polarized beams, the co-phasing information having been selected by the wireless device to indicate a preferred co-phasing of two antenna ports corresponding to the two beamformed BRS comprised in the sub-report.

23. The network node according to claim 21, wherein the report on channel information is a Channel State Information, CSI, report, and wherein the indicator of channel quality is a Channel Quality Indicator, CQI, value.

24. The network node according to claim 21, wherein a first sub-report associated with the first associated TP beam further comprises a BRS indicator, the BRS indicator identifying one or two BRS, or one or two antenna ports, associated with the first associated TP beam in the first sub-report.

25. The network node according to claim 21, wherein the indicator of channel quality value has been computed by the wireless device by taking into account an interference by selected beams associated with other code words in a same sub-report and associated with other code words in other sub-reports within a same report.

26. The method of claim 21,
wherein the at least one TP transmits first and second TP beams so that the number N of the TP beams is at least two,
wherein the first TP beam is associated with a first BRS and the second TP beam is associated with a second BRS,
wherein the number of sub-reports includes first and second sub-reports,
wherein the at least one indicator of channel quality value includes first and second indicators of channel quality value,
wherein the first sub-report is associated with the first TP beam and the first indicator of channel quality value for a first code word transmitted on the first TP beam,
wherein the second sub-report is associated with the second TP beam and the second indicator of channel quality value for a second code word transmitted on the second TP beam,
wherein the first and second code words are different.

* * * * *